(12) United States Patent
Sabhnani et al.

(10) Patent No.: US 11,167,923 B2
(45) Date of Patent: Nov. 9, 2021

(54) SYSTEM AND METHOD FOR TRANSPORTING INVENTORY IN STORAGE FACILITY

(71) Applicant: GREY ORANGE PTE. LTD., Singapore (SG)

(72) Inventors: Jatin Sabhnani, New Delhi (IN); Ravish Kumbhare, Jalgaon (IN); Siddhant Garg, Agra (IN); Siddhant Sharma, Noida (IN); Varun Saini, Pathankot (IN)

(73) Assignee: GREY ORANGE PTE. LTD., Singapore (SG)

( * ) Notice: Subject to any disclaimer, the term of this patent is extended or adjusted under 35 U.S.C. 154(b) by 30 days.

(21) Appl. No.: 16/728,543

(22) Filed: Dec. 27, 2019

(65) Prior Publication Data

US 2021/0198037 A1 Jul. 1, 2021

(51) Int. Cl.
*B65G 1/04* (2006.01)
*B65G 1/10* (2006.01)
(Continued)

(52) U.S. Cl.
CPC .......... *B65G 1/0471* (2013.01); *B65G 1/10* (2013.01); *B66F 9/063* (2013.01); *B65G 1/026* (2013.01);
(Continued)

(58) Field of Classification Search
CPC . B62B 3/04; B62B 5/0083; B60P 1/02; B60P 1/6445; B65G 1/0471; B65G 1/10;
(Continued)

(56) References Cited

U.S. PATENT DOCUMENTS 3,647,014 A * 3/1972 Wilke ............... B62B 3/0612
180/14.1
4,861,220 A 8/1989 Smith
(Continued)

FOREIGN PATENT DOCUMENTS

JP 10-105238 A 4/1998
WO WO 2019/141257 A1 7/2019

OTHER PUBLICATIONS

International Search Report and Written Opinion dated May 3, 2021 in PCT/IB2020/001077, 15 pages.

*Primary Examiner* — James Keenan
(74) *Attorney, Agent, or Firm* — Oblon, McClelland, Maier & Neustadt, L.L.P.

(57) ABSTRACT

A method and a system for transporting inventory in a storage facility is provided. The system includes an inventory storage unit (ISU) and a transport vehicle. The ISU includes a base shelf, and a plurality of support plates mounted below the base shelf. The transport vehicle includes a top plate and a control device that controls movement of the top plate. Upon actuation of an interlocking mechanism of the transport vehicle that is aligned beneath the ISU, the top plate is lifted to a first height and then rotated for engaging the top plate with the support plates of the ISU. The engaged top plate is further lifted to a second height to lift the ISU off the work floor of a storage facility. Upon lifting the ISU, the transport vehicle transports the ISU to another location in the storage facility.

20 Claims, 13 Drawing Sheets

(51) Int. Cl.
*B66F 9/06* (2006.01)
*B65G 1/02* (2006.01)
*B65G 1/06* (2006.01)

(52) U.S. Cl.
CPC ............ *B65G 1/0492* (2013.01); *B65G 1/065* (2013.01); *B65G 2203/0216* (2013.01)

(58) Field of Classification Search
CPC ..... B65G 1/1373; B65G 1/1375; B66F 9/063; B66F 9/065; B66F 9/18
USPC ..... 294/67.32, 81.52; 410/80; 414/495, 498, 414/672
See application file for complete search history.

(56) References Cited

U.S. PATENT DOCUMENTS

| | | | | |
|---|---|---|---|---|
| 7,402,018 | B2 * | 7/2008 | Mountz | B60P 1/64 414/331.06 |
| 7,556,462 | B2 * | 7/2009 | Huber | B64C 1/20 410/92 |
| 7,850,413 | B2 * | 12/2010 | Fontana | B66F 3/44 414/331.14 |
| 7,871,234 | B2 * | 1/2011 | Yuyama | B62B 5/0083 414/498 |
| 8,280,547 | B2 * | 10/2012 | D'Andrea | B66F 9/063 700/214 |
| 9,280,153 | B1 * | 3/2016 | Palamarchuk | B65G 1/137 |
| 9,389,609 | B1 * | 7/2016 | Mountz | B65G 1/0471 |
| 9,707,879 | B2 | 7/2017 | Mecklinger | |
| 10,336,150 | B1 * | 7/2019 | Hebert | G05B 19/4189 |
| 10,908,601 | B2 * | 2/2021 | Diehr | B66F 9/063 |
| 2006/0210382 | A1 | 9/2006 | Mountz et al. | |
| 2018/0141752 | A1 * | 5/2018 | Nakanishi | B66F 9/063 |
| 2019/0381843 | A1 | 12/2019 | Miyamoto et al. | |
| 2020/0216298 | A1 * | 7/2020 | Gravelle | B66F 9/063 |

* cited by examiner

SYSTEM AND METHOD FOR TRANSPORTING INVENTORY IN STORAGE FACILITY

FIELD OF THE DISCLOSURE

The present disclosure relates generally to inventory management systems, and more particularly, to a system and a method for transporting inventory in a storage facility.

BACKGROUND

Modern storage facilities or warehouses handle a large number of inventory items or packages of inventory items on a daily basis. Typically, the inventory items or the packages are stored in multiple inventory storage units. These storage facilities utilize transport vehicles (for example, automated guided vehicles, AGVs) for transporting the inventory storage units from one location to another location inside the storage facilities.

For transporting an inventory storage unit between two locations, a transport vehicle is required to accelerate and deaccelerate multiple times. Such acceleration and deceleration of the transport vehicle generates an inertial load on the inventory storage unit. Generation of the inertial load may cause variations in the center of gravity of the inventory storage. Due to the varying center of gravity, there exists a risk of the inventory storage unit leaving its contact with the transport vehicle. This phenomenon is very critical as it affects the stability of the inventory storage unit during transportation and may result in the toppling of the inventory storage unit. Toppling of the inventory storage unit may not only cause damage to the inventory items or the packages stored therein but may also cause damage to nearby transport vehicles and inventory storage units, leading to a significant loss in revenue. Further, a throughput and/or an efficiency of operations at the storage facility may be adversely affected as a result of the toppling of the inventory storage unit. Conventional techniques for securing an inventory storage unit to a transport vehicle utilize electromagnetic locks and sensors. The use of electromagnetic locks and sensors increases the overall cost of the inventory storage units and the transport vehicles used on the storage facility, which is not desirable.

In light of the foregoing, there exists a need for a technical solution that not only prevents toppling of inventory storage units during transportation but also improves throughputs for operations at a storage facility.

SUMMARY

In an embodiment of the present disclosure, a system for transporting inventory in a storage facility is provided. The system includes an inventory storage unit that stores one or more inventory items. The inventory storage unit includes a base shelf and a plurality of support plates mounted below the base shelf. The system further includes a transport vehicle for transporting the inventory storage unit. The transport vehicle includes a top plate having first and second orientations and a control device configured to control movement of the top plate. The control device is further configured to actuate an interlocking mechanism of the transport vehicle that is aligned beneath the inventory storage unit, based on a center of gravity of the inventory storage unit. The control device is further configured to lift the top plate to a first height for positioning the top plate between the base shelf and the plurality of support plates, upon the actuation of the interlocking mechanism. The top plate has the first orientation, when lifted to the first height, and is free from engagement with the plurality of support plates. The control device is further configured to rotate the top plate that is at the first height by a predetermined angle in a first direction. The rotation of the top plate changes the first orientation to the second orientation and the top plate engages with at least one support plate of the plurality of support plates. The control device is further configured to lift the rotated top plate to a second height to lift the inventory storage unit off a work floor of the storage facility, for transportation. The inventory storage unit is lifted off the work floor based on a contact between a top surface of the top plate and a bottom surface of the base shelf. The at least one support plate prevents the lifted inventory storage unit from toppling during transportation.

In an embodiment of the present disclosure, a method for transporting inventory in a storage facility is provided. The method includes actuating, by a control device of a transport vehicle, an interlocking mechanism of the transport vehicle based on a center of gravity of an inventory storage unit, when the transport vehicle is aligned beneath the inventory storage unit. Upon actuation of the interlocking mechanism of the transport vehicle, a top plate of the transport vehicle is lifted to a first height, by the control device, for positioning the top plate between a base shelf of the inventory storage unit and a plurality of support plates of the inventory storage unit. The top plate has a first orientation, when lifted to the first height, and is free from engagement with the plurality of support plates. The top plate that is at the first height is rotated by a predetermined angle in a first direction by the control device. The rotation of the top plate changes the first orientation of the top plate to a second orientation and the top plate engages with at least one support plate of the plurality of support plates. The rotated top plate is further lifted, by the control device, to a second height to lift the inventory storage unit off a work floor of the facility, for transportation. The inventory storage unit is lifted off the work floor based on a contact between a top surface of the top plate and a bottom surface of the base shelf. The at least one support plate prevents the lifted inventory storage unit from toppling during transportation.

In another embodiment of the present disclosure, a system for transporting inventory in a storage facility is provided. The system comprises an inventory storage unit, a transport vehicle for transporting the inventory storage unit, and a server. The inventory storage unit includes a base shelf and a plurality of support plates mounted below the base shelf. The transport vehicle includes a top plate having first and second orientations and a control device configured to control movement of the top plate. The server is communicatively coupled to the transport vehicle and configured to actuate an interlocking mechanism of the transport vehicle that is aligned beneath the inventory storage unit, based on a center of gravity of the inventory storage unit. Based on the actuation of the interlocking mechanism, the control device is further configured to lift the top plate to a first height for positioning the top plate between the base shelf and the plurality of support plates. The top plate has the first orientation, when lifted to the first height, and is free from engagement with the plurality of support plates. The control device is further configured to rotate the top plate that is at the first height by a predetermined angle in a first direction. The rotation of the top plate changes the first orientation to the second orientation and the top plate engages with at least one support plate of the plurality of support plates. The control device is further configured to lift the rotated top plate to a second height to lift the inventory storage unit off a work floor of the storage facility, for transportation. The inventory storage unit is lifted off the work floor based on a contact between a top surface of the top plate and a bottom surface of the base shelf. The at least one support plate prevents the lifted inventory storage unit from toppling during transportation.

BRIEF DESCRIPTION OF THE DRAWINGS

The accompanying drawings illustrate the various embodiments of systems, methods, and other aspects of the disclosure. It will be apparent to a person skilled in the art that the illustrated element boundaries (e.g., boxes, groups of boxes, or other shapes) in the figures represent one example of the boundaries. In some examples, one element may be designed as multiple elements, or multiple elements may be designed as one element. In some examples, an element shown as an internal component of one element may be implemented as an external component in another, and vice versa.

Various embodiments of the present disclosure are illustrated by way of example, and not limited by the appended figures, in which like references indicate similar elements.

Figure 1:
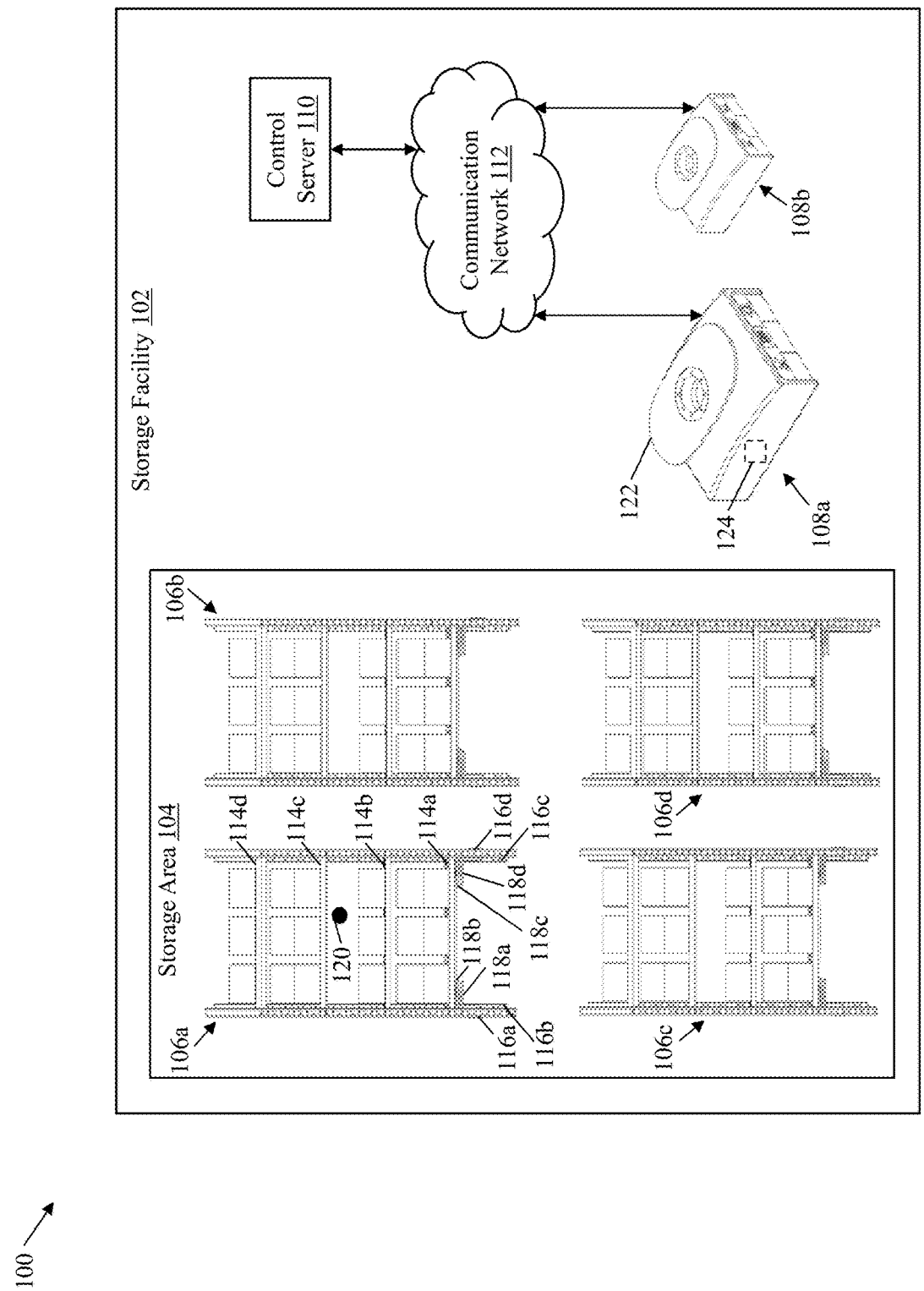
FIG. 1 is a block diagram that illustrates an exemplary environment, in accordance with an exemplary embodiment of the present disclosure.

Further areas of applicability of the present disclosure will become apparent from the detailed description provided hereinafter. It should be understood that the detailed description of exemplary embodiments is intended for illustration purposes only and is, therefore, not intended to necessarily limit the scope of the disclosure.

DETAILED DESCRIPTION

The present disclosure is best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. In one example, the teachings presented and the needs of a particular application may yield multiple alternate and suitable approaches to implement the functionality of any detail described herein. Therefore, any approach may extend beyond the particular implementation choices in the following embodiments that are described and shown.

References to "an embodiment", "another embodiment", "yet another embodiment", "one example", "another example", "yet another example", "for example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in an embodiment" does not necessarily refer to the same embodiment.

Various embodiments of the present disclosure provide a method and system for transporting inventory in a storage facility. The system includes a control server, at least one inventory storage unit (ISU), and at least one transport vehicle. The ISU may include a plurality of shelves for storing inventory items. The ISU may further include a plurality of support plates mounted below the lower most shelf (i.e., a base shelf). The transport vehicle includes a top plate having at least first and second orientations and a control device that controls movement of the top plate. The control server receives a service request that requires the ISU to be transported from a first location to a second location in the storage facility. The control server then communicates a transit instruction to the transport vehicle for instructing the transport vehicle to transport the ISU from the first location to the second location. Based on the transit instruction, the transport vehicle reaches the first location and aligns beneath the base shelf of the ISU.

In one embodiment, based on the COG of the ISU, the control server actuates an interlocking mechanism of the transport vehicle, remotely. In another embodiment, based on the COG of the ISU, the control device actuates the interlocking mechanism of the transport vehicle. Upon the actuation of the interlocking mechanism, the top plate is lifted to a first height and positioned between the base shelf and the plurality of support plates. When lifted to the first height, the top plate has the first orientation and is free from engagement with the plurality of support plates. The top plate is then rotated in either clockwise direction or anti-clockwise direction by a predetermined angle. Rotating the top plate by the predetermined angle changes the first orientation to the second orientation, and the top plate engages with two diagonally opposite support plates of the ISU. The rotated top plate is further lifted to a second height to lift the ISU off the work floor of the storage facility. Upon lifting the ISU off the work floor, the transport vehicle transports the ISU to the second location. During transportation, the two diagonally opposite support plates that are engaged with the top plate prevents the ISU from toppling. Upon reaching the second location, the top plate is disengaged from the two diagonally opposite support plates of the ISU, and the ISU is placed on the work floor of the storage facility. Thus, the method and system provide a secure mechanism that prevents the ISU from toppling during transportation.

In some embodiments, "Storage facility" may be a warehouse or a retail store. Other examples of the storage facility may include a sorting facility for sorting packages, a package processing facility for processing packages, or the like. The storage facility includes various inventory storage units (ISUs) for storing inventory items or packages and various transport vehicles for transporting the ISUs within the storage facility.

In some embodiments, "ISU" is a portable unit that stores various inventory items or material. In a goods-to-person (GTP) scenario, the inventory storage unit is transported by a transport vehicle within the storage facility, for order fulfillment or replenishment. The inventory storage unit may include multiple shelves for storing the inventory items.

In some embodiments, "Support plate" may be a support structure that is mounted below the lowermost shelf (i.e., the base shelf) of the ISU. The support plate is capable of engagement with a top plate of a transport vehicle used for transporting the ISU, such that by way of the support plate, the ISU is prevented from toppling during transportation.

In some embodiments, "Transport vehicle" may be a robotic vehicle (such as an automated guided vehicle, AGV) that executes one or more operations in a storage facility. For example, in a GTP scenario, the transport vehicle transports an ISU from one location to another location in the storage facility for order fulfillment or replenishment.

In some embodiment, "Top plate" is a contact member of a transport vehicle. When the transport vehicle is used for transporting an ISU, the top plate of the transport vehicle is utilized for lifting the ISU. The top plate further engages with one or more support plates of the ISU, for preventing the ISU from toppling.

In some embodiments, "first orientation" and "second orientation" correspond to angular positions of a top plate of a transport vehicle. The first orientation is an initial angular position of the top plate such that when the top plate has the first orientation, the top plate is free from engagement from support plates of an ISU that is to be transported by the transport vehicle. The second orientation is attained when the top plate is lifted to a certain height (e.g., a first height) and rotated by a predetermined angle. When the top plate has the second orientation, the top plate is engaged with at least one support plate of the ISU that is to be transported by the transport vehicle.

In some embodiments, "Server" is a physical or cloud data processing system on which a server program runs. The server may be implemented in hardware or software, or a combination thereof. In one embodiment, the server may be implemented in computer programs executing on programmable computers, such as personal computers, laptops, or a network of computer systems. In one example, the server may be a warehouse management server.

FIG. 1 is a block diagram that illustrates an exemplary environment 100, in accordance with an exemplary embodiment of the present disclosure. The environment 100 shows a storage facility 102. The storage facility 102 includes a storage area 104, a plurality of inventory storage units (ISUs) 106a-106d (hereinafter, the plurality of ISUs 106a-106d are collectively referred to as "the ISUs 106"), a plurality of transport vehicles 108a and 108b (hereinafter, the plurality of transport vehicles 108a and 108b are collectively referred to as "the transport vehicles 108"), and a control server 110. The control server 110 communicates with the transport vehicles 108 by way of a communication network 112 or via separate communication networks established therebetween.

The storage facility 102 is a facility where inventory items or packages of inventory items are stored for order fulfillment and/or selling. Examples of the storage facility 102 may include, but are not limited to, a forward warehouse, a backward warehouse, a fulfilment center, or a retail store (e.g., a supermarket, an apparel store, a departmental store, a grocery store, or the like). Examples of the inventory items may include, but are not limited to, groceries, apparels, electronic goods, mechanical goods, or the like. The storage facility 102 has the storage area 104 where the ISUs 106 are placed for storing the inventory items or the packages. The storage area 104 may be of any shape, for example, a rectangular shape. In one embodiment, the ISUs 106 in the storage area 104 may be arranged to form aisles therebetween. Arrangement of the ISUs 106 in the storage area 104 is a standard practice and will be apparent to those of skill in the art.

Figure 2:
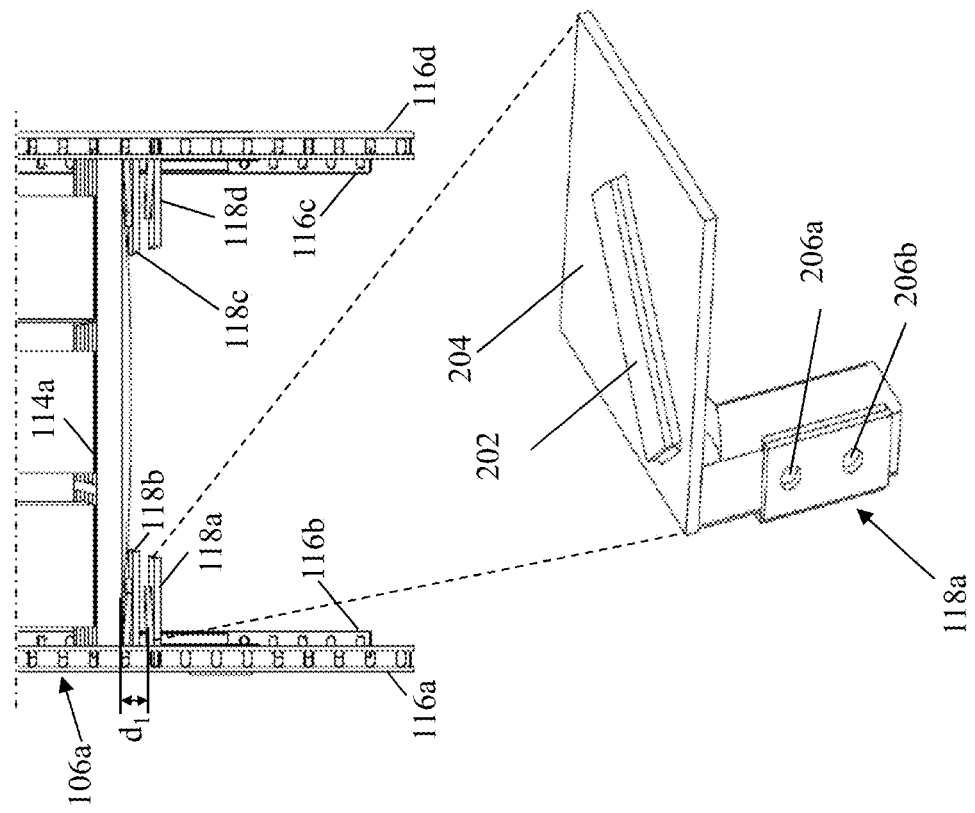
FIG. 2 is a block diagram that illustrates an example of support plates of inventory storage units in a storage facility of FIG. 1, in accordance with an exemplary embodiment of the present disclosure.

The ISUs 106 are units for storing various inventory items and/or various packages. Each ISU 106 may include multiple shelves, which enable the ISUs 106 to store multiple inventory items or packages. The bottom shelf of each ISU 106 is referred to as "a base shelf". Each ISU 106 further includes a plurality of support plates mounted below the base shelf. In one embodiment, the plurality of support plates may be mounted below the base shelf at a fixed distance (i.e., distance $d_1$). In another embodiment, the plurality of support plates may be attached, at a fixed distance (i.e., distance $d_1$) below the base shelf, to a plurality of legs (for example, four legs) of the corresponding ISU 106. In another embodiment, the plurality of support plates, in each ISU 106, may be detachably attached to the base shelf or the plurality of legs, thereby providing flexibility of varying the distance between the plurality of support plates and the base shelf. For example, as shown in FIG. 1, the ISU 106a includes first through fourth shelves 114a-114d and first through fourth legs 116a-116d below the first shelf 114a (i.e., the base shelf 114a of the ISU 106a) to support the ISU 106a on a work floor of the storage facility 102. The ISU 106a further includes first through fourth support plates 118a-118d (hereinafter, the first through fourth support plates 118a-118d are collectively referred to as "the support plates 118") that are mounted below the base shelf 114a at the fixed distance (i.e., distance $d_1$, as shown in FIG. 2). Structural details of the support plates 118 are described later in conjunction with FIG. 2.

Each ISU 106 may further include a reference marker attached to or formed on a bottom surface of the corresponding base shelf for uniquely identifying the corresponding ISU 106. Examples of the reference marker may include, but are not limited to, a barcode, a quick response (QR) code, a radio frequency identification device (RFID) tag, or the like. It will be apparent to those of skill in the art that the ISUs 106 may further include additional structural features that aid in carrying or otherwise transporting the ISUs 106, without deviating from the scope of the disclosure.

Each ISU 106 has a corresponding center of gravity (COG). A position of the COG of each ISU 106 may vary based on various factors, such as dimensions, configuration, shape, and weight of the corresponding ISU 106, and dimensions of the shelves of the corresponding ISU 106. The position of the COG of each ISU 106 may further vary based on a weight, a shape, dimensions, and a storage position of each inventory item stored in the corresponding ISU 106. For example, as shown in FIG. 1, the ISU 106a has the COG at a position 120. The position 120 of the COG of the ISU 106a may be based on the dimensions, the shape, the configuration, and the weight of the ISU 106a, and the dimensions of the shelves of the ISU 106a. The position 120 of the COG of the ISU 106a may be further based on weights, shapes, and dimensions of the inventory items stored in the ISU 106a. The ISUs 106 are transported by the transport vehicles 108 within the storage facility 102, for order fulfillment or replenishment.

The transport vehicles 108 are robotic vehicles (i.e., automated guided vehicles, AGVs) used in the storage facility 102 for picking, carrying, and transporting the ISUs 106 from one location to another location. The transport vehicles 108 may be configured to communicate with the control server 110 via the communication network 112 by using various wired, wireless, or optical communication protocols. The transport vehicles 108 may vary in terms of sizes, dimensions, weight lifting capacity, or the like. Each transport vehicle 108 includes a top plate for lifting the ISUs 106 and a control device for controlling a movement (i.e., rotational movement and vertical movement) of the corresponding top plate. For example, as shown in FIG. 1, the transport vehicle 108a includes a top plate 122 and a control device 124. The top plate 122 is rotatable and may have multiple orientations. The control device 124 may include suitable logic, circuitry, interfaces, and/or code, executable by the circuitry, to execute various operations to control the movement of the top plate 122 and the transport vehicle 108a.

The top plate of each transport vehicle 108 is capable of engaging with at least two diagonally opposite support plates of the ISUs 106 to ensure stability of the ISUs 106 when transported by the transport vehicles 108. For example, the top plate 122 may engage with two diagonally opposite support plates (i.e., the first and third support plates 118a and 118c or the second and fourth support plates 118b and 118d) of the ISU 106a when the ISU 106a is transported by the transport vehicle 108a. For engaging the top plate of each transport vehicle 108 with the support plates of an ISU (e.g., any of the ISUs 106) that is to be transported, each transport vehicle 108 may implement an interlocking mechanism. In one embodiment, the interlocking mechanism may be actuated remotely by the control server 110. In another embodiment, the interlocking mechanism may be actuated locally by the control devices of the transport vehicles 108. In a scenario where the interlocking mechanism of the transport vehicle 108a is not actuated, the top plate 122 may not engage with the support plates 118 of the ISU 106a. Various components of the transport vehicle 108a and their functionalities have been described later in conjunction with FIG. 3.

The control server 110 may include suitable logic, circuitry, interfaces, and/or code, executable by the circuitry, to facilitate various inventory management operations in the storage facility 102. Examples of the control server 110 may include, but are not limited to, personal computers, laptops, mini-computers, mainframe computers, any non-transient and tangible machine that can execute a machine-readable code, cloud-based servers, distributed server networks, or a network of computer systems. The control server 110 may be realized through various web-based technologies such as, but not limited to, a Java web-framework, a .NET framework, a personal home page (PHP) framework, or any other web-application framework. The control server 110 may be maintained by a storage facility management authority or a third-party entity that facilitates inventory management and handling operations for the storage facility 102. It will be understood by a person having ordinary skill in the art that the control server 110 may execute other storage facility management operations as well along with the inventory management operations.

The control server 110 may be configured to communicate transit instructions to the transport vehicles 108 for transporting the ISUs 106. Each transit instruction may include reference marker details of at least one ISU 106 that needs to be transported and path details of a path that is to be traversed by each transport vehicle 108 for transporting the at least one ISU 106. The control server 110 may be further configured to determine the position of the COG and a COG tolerance region for each ISU 106. For example, the COG tolerance region of the ISU 106a may define a permissible COG range for the ISU 106a such that if the COG of the ISU 106a is maintained within the COG tolerance region, the ISU 106a is stable and may not topple during transportation. In one embodiment, the control server 110 may actuate the interlocking mechanism of the transport vehicles 108 for preventing the ISUs 106 from toppling during transportation. The control server 110 may further transmit actuation commands to the transport vehicles 108 for actuating the interlocking mechanism of the transport vehicles 108.

The communication network 112 is a medium through which instructions and messages are transmitted between the transport vehicles 108 and the control server 110. Examples of the communication network 112 include, but are not limited to, a Wi-Fi network, a light fidelity (Li-Fi) network, a local area network (LAN), a wide area network (WAN), a metropolitan area network (MAN), a satellite network, the Internet, a fiber optic network, a coaxial cable network, an infrared (IR) network, a radio frequency (RF) network, and combinations thereof. Various entities in the environment 100 may connect to the communication network 112 in accordance with various wired and wireless communication protocols, such as Transmission Control Protocol and Internet Protocol (TCP/IP), User Datagram Protocol (UDP), Long Term Evolution (LTE) communication protocols, or any combination thereof.

In operation, the control server 110 may receive a service request that requires the ISU 106a to be transported from a first location to a second location in the storage facility 102. In one embodiment, the first location corresponds to a pickup location or an initial location of the ISU 106a, and the second location corresponds to a drop location or a destination location of the ISU 106a. The control server 110 may then communicate a transit instruction to the transport vehicle 108a via the communication network 112 for instructing the transport vehicle 108a to transport the ISU 106a from the first location to the second location.

Based on the transit instruction, the transport vehicle 108a reaches the first location and aligns beneath the base shelf 114a of the ISU 106a. In one embodiment, based on the COG of the ISU 106a, the control server 110 may communicate an actuation command to actuate the interlocking mechanism of the transport vehicle 108a. In another embodiment, based on the COG of the ISU 106a, the control device 124 may actuate the interlocking mechanism of the transport vehicle 108a. When the interlocking mechanism is actuated, the transport vehicle 108a may only be able to transport the ISU 106a after the top plate 122 is engaged with the support plates 118.

Figure 4A:
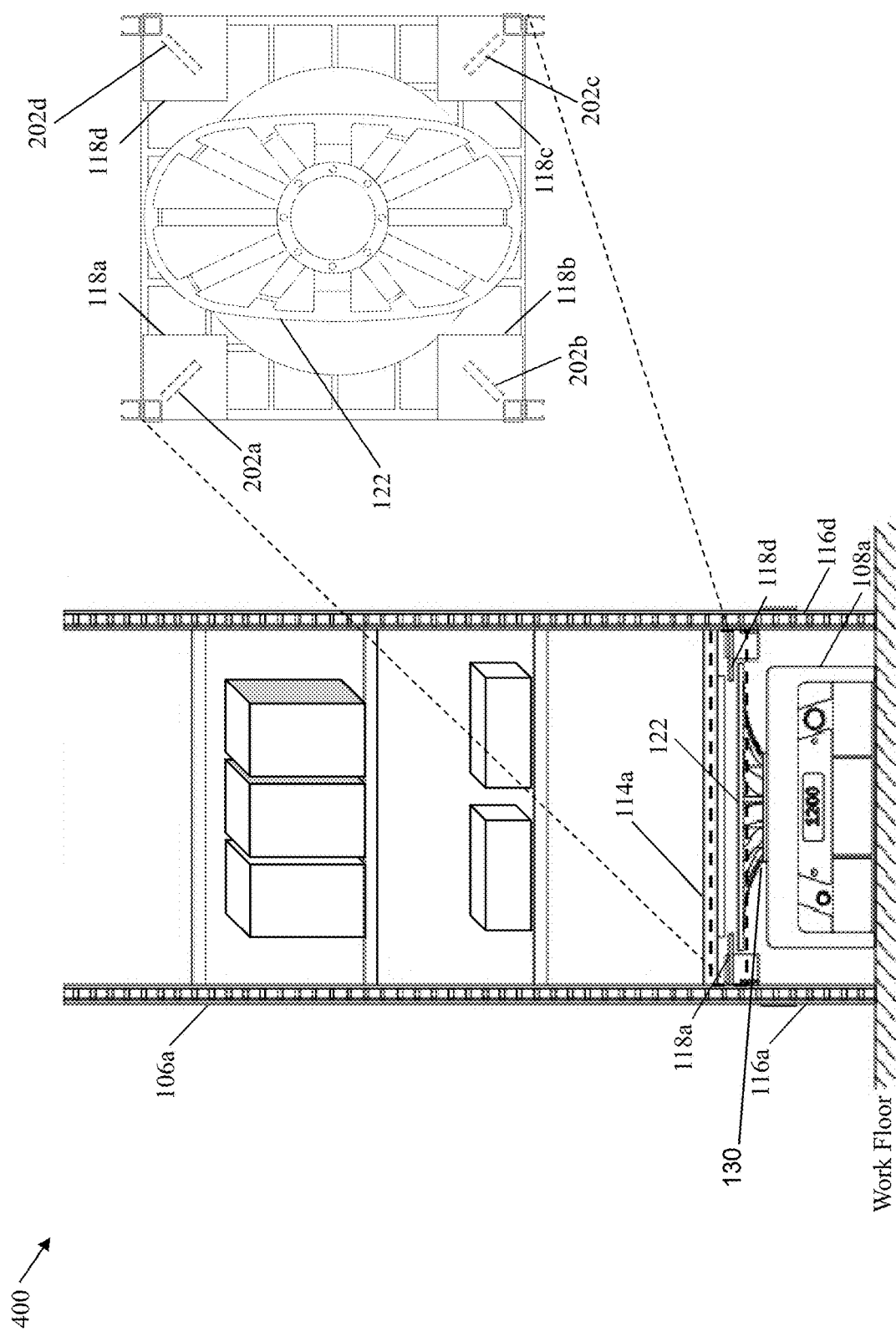
FIGS. 4A-4F are block diagrams that collectively illustrates an exemplary scenario for transporting the inventory storage unit in the storage facility of FIG. 1, in accordance with an exemplary embodiment of the present disclosure.
Figure 4B:
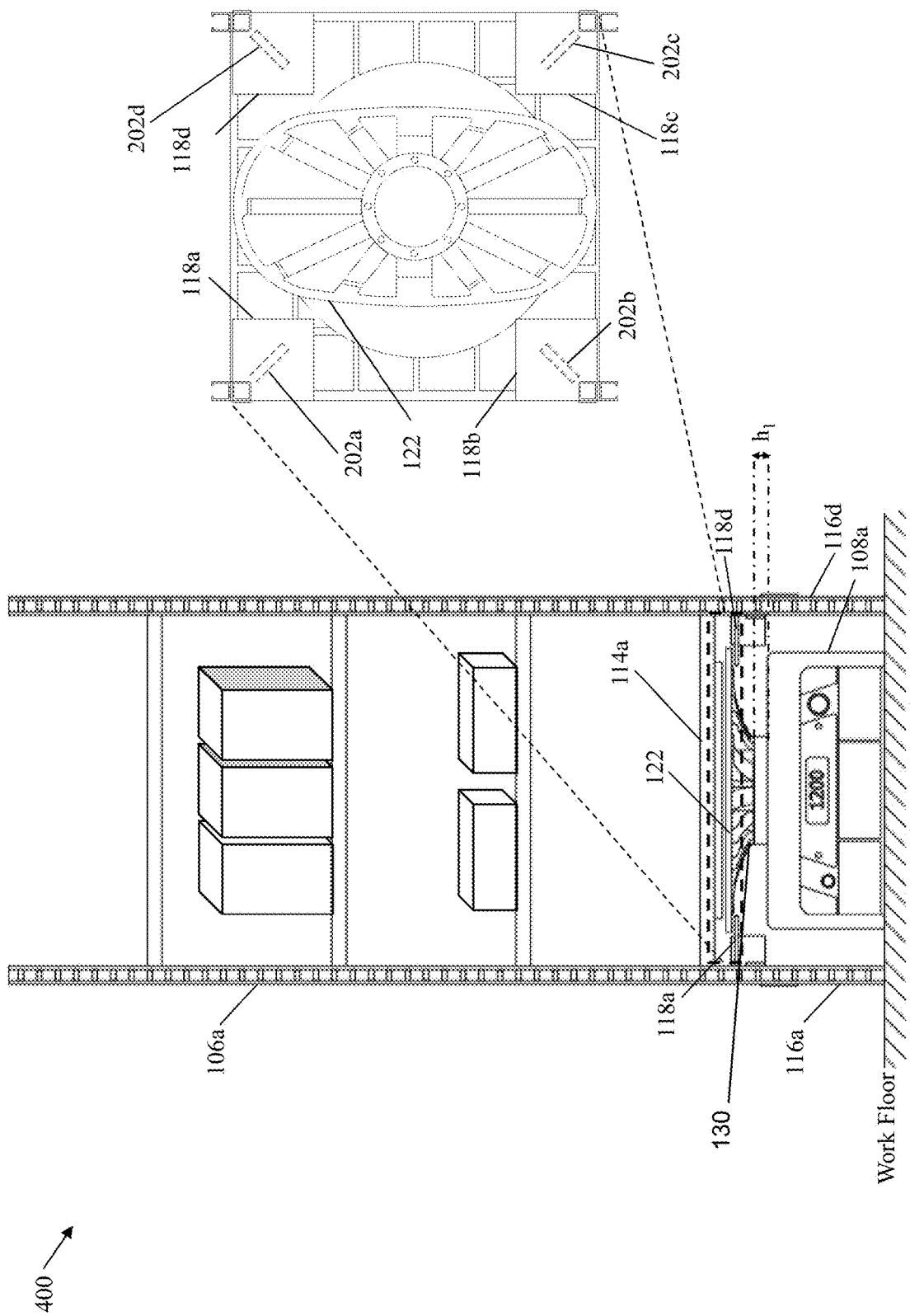
Figure 4C:
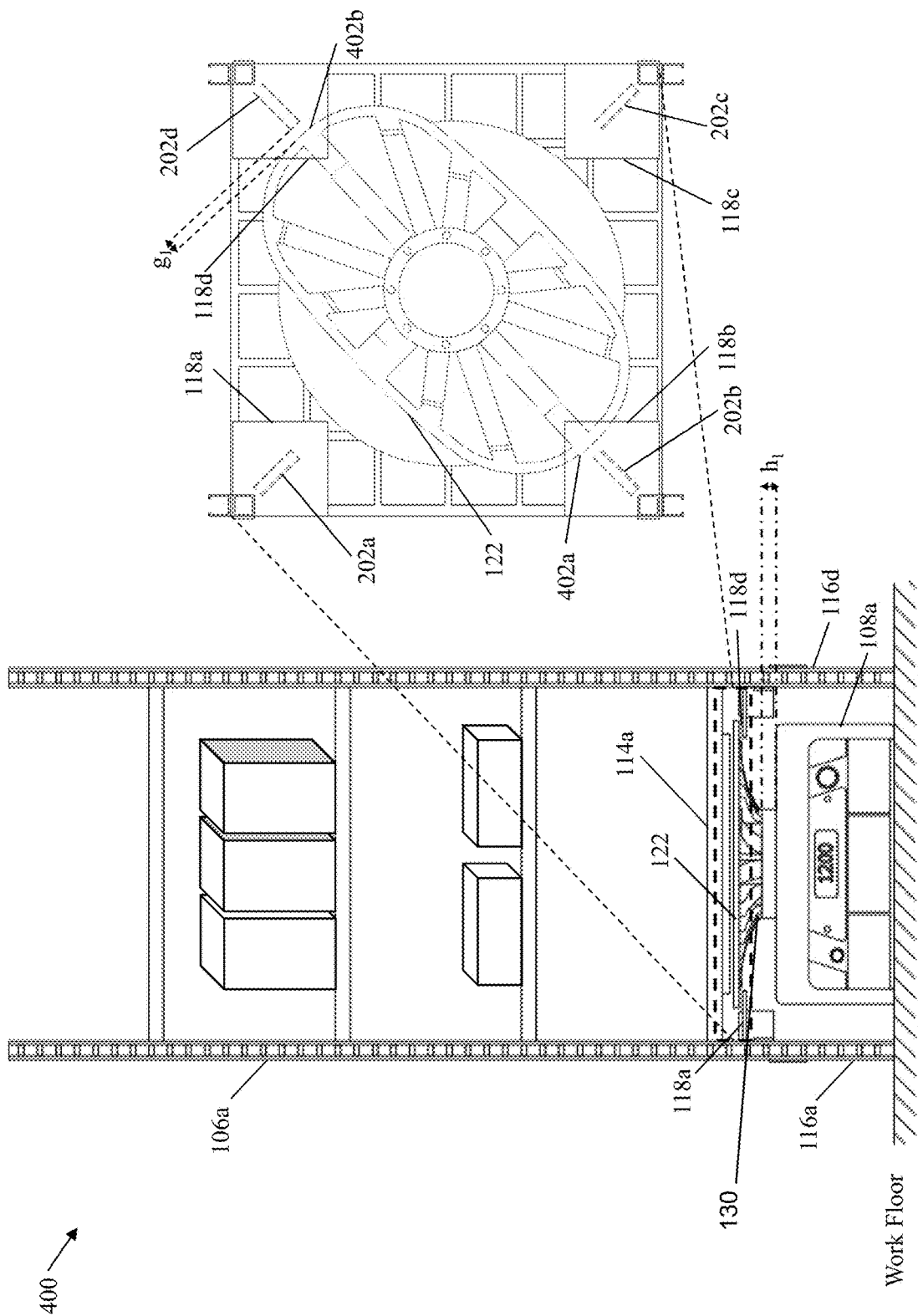
Figure 4D:
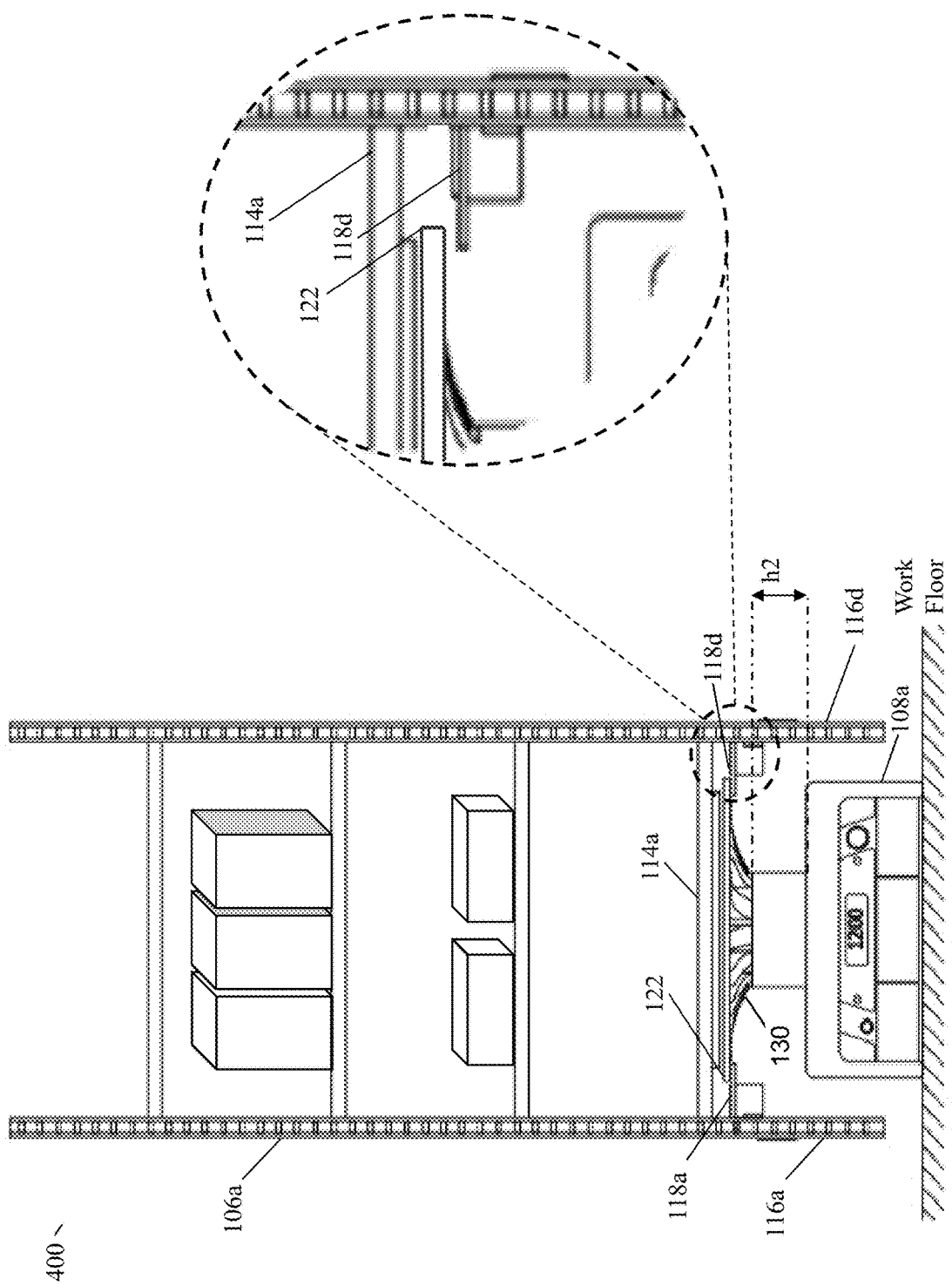

Upon the actuation of the interlocking mechanism, the top plate 122 is lifted to a first height (i.e., $h_1$, as shown in FIG. 4B) to position the top plate 122 in a gap (i.e., the fixed distance $d_1$) between the base shelf 114a and the support plates 118. When the top plate 122 is at the first height ($h_1$), the top plate 122 has a first orientation and is free from engagement with the support plates 118. The lifted top plate 122 is then rotated in either clockwise direction or anti-clockwise direction by a predetermined angle, thus changing the first orientation to a second orientation of the top plate 122. In the second orientation, the top plate 122 engages with two diagonally opposite support plates (i.e., the first and third support plates 118a and 118c or the second and fourth support plates 118b and 118d) of the ISU 106a. In one embodiment, when the top plate 122 is engaged with the two diagonally opposite support plates (i.e., the first and third support plates 118a and 118c or the second and fourth support plates 118*b* and 118*d*), the top plate 122 may not be in contact with the two diagonally opposite support plates. In another embodiment, when the top plate 122 is engaged with the two diagonally opposite support plates (i.e., the first and third support plates 118*a* and 118*c* or the second and fourth support plates 118*b* and 118*d*), the top plate 122 may be in contact with the two diagonally opposite support plates. The top plate 122 that is engaged with the two diagonally opposite support plates of the ISU 106*a* is further lifted to a second height ($h_2$, as shown in FIG. 4D) to lift the ISU 106*a* off the work floor of the storage facility 102. Upon lifting the ISU 106*a* off the work floor, the transport vehicle 108*a* may transport the ISU 106*a* to the second location. Upon reaching the second location, the top plate 122 is disengaged from the two diagonally opposite support plates of the ISU 106*a*, and the ISU 106*a* is placed on the work floor of the storage facility 102.

FIG. 2 is a block diagram that illustrates an example of the first support plate 118*a*, in accordance with an exemplary embodiment of the disclosure. The support plates 118 prevent the ISU 106*a* from toppling during transportation. It will be apparent to a person of skill in the art that the second through fourth support plates 118*b*-118*d* are structurally and functionally similar to the first support plate 118*a*.

The first support plate 118*a* includes an elevated portion 202 on a surface 204 of the first support plate 118*a*. For example, as shown in FIG. 2, the elevated portion 202 may be a rectangular block running diagonally along the surface 204. In another example, the elevated portion 202 may be a triangular block positioned on the surface 204. A clearance gap ($g_1$ as shown in FIG. 4C) may be formed between an edge of the elevated portion 202 and an edge of the top plate 122 during engagement of the top plate 122 with the first support plate 118*a*. In one embodiment, as shown in FIG. 2, the first support plate 118*a* may further include holes 206*a* and 206*b* for fastening the first support plate 118*a* to the first leg 116*a* of the ISU 106*a* by way of nuts and bolts. In another embodiment, the first support plate 118*a* may be attached to the first leg 116*a* by way of an adhesive material. In another embodiment, the first support plate 118*a* may be formed on the first leg 116*a*.

It will be apparent to a person of ordinary skill in the art that the first support plate 118*a* shown in FIG. 2 is for illustrative purpose and should not be construed to limit the scope of the disclosure. In other embodiments, the first support plate 118*a* may have a different shape, dimensions, and size without deviating from the scope of the disclosure. For example, the first support plate 118*a* may have a structure that enables the first support plate 118*a* to be fastened on a bottom surface of the base shelf 114*a*, while maintaining the distance $d_1$ between the bottom surface of the base shelf 114*a* and the surface 204.

Figure 3:
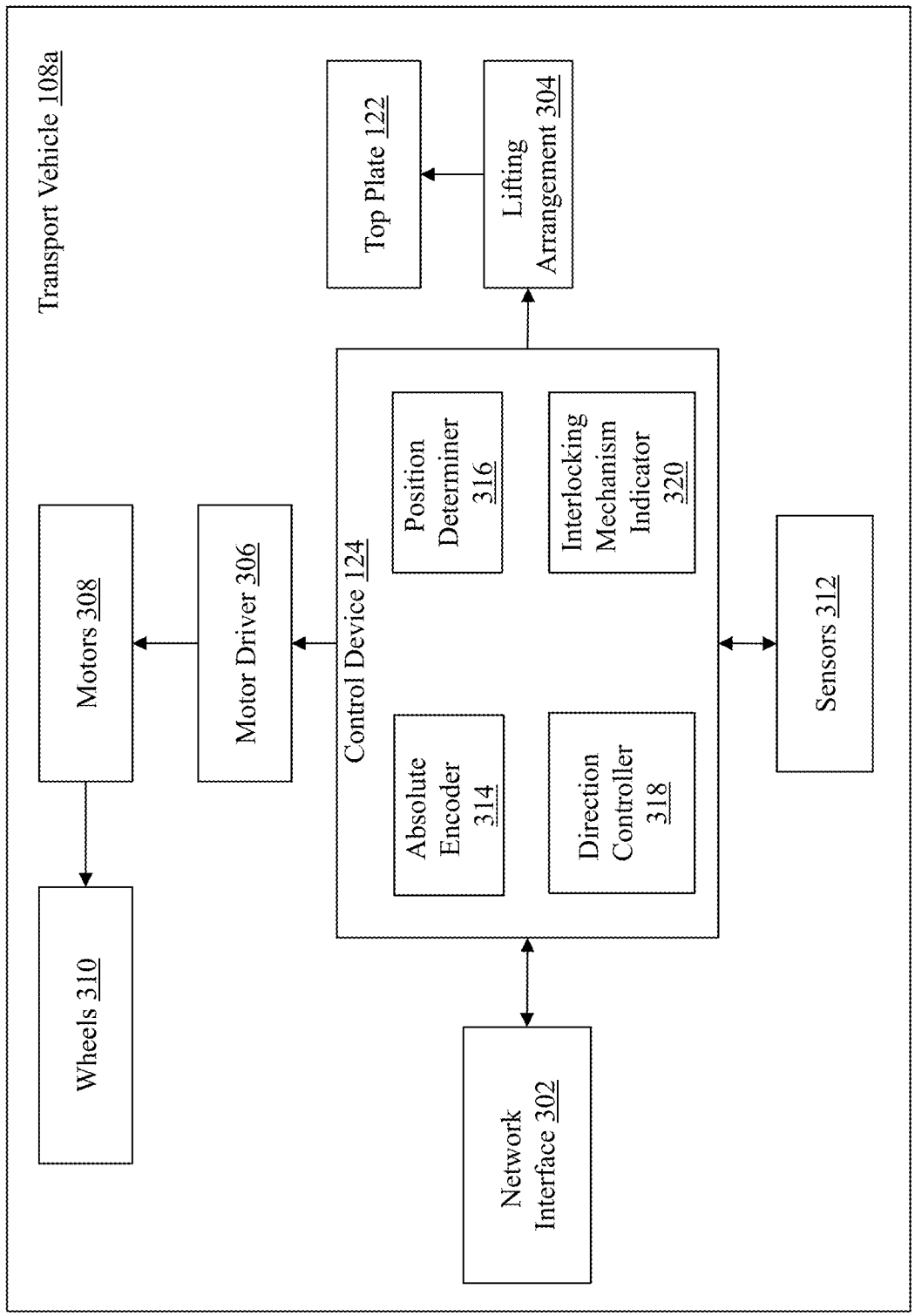
FIG. 3 is a block diagram that illustrates an architecture of a transport vehicle of FIG. 1, in accordance with an exemplary embodiment of the present disclosure.

FIG. 3 is a block diagram that illustrates the transport vehicle 108*a* of FIG. 1, in accordance with an exemplary embodiment of the present disclosure. The transport vehicle 108*a* includes the top plate 122, the control device 124, a network interface 302, a lifting arrangement 304, a motor driver 306, motors 308, wheels 310, and sensors 312.

The control device 124 may be configured to navigate the transport vehicle 108*a* in the storage facility 102. The control device 124 may be further configured to determine a position of the COG of the ISU 106*a* based on a weight distribution profile of the ISU 106*a*. The control device 124 may be further configured to control the movement of the top plate 122 by way of the lifting arrangement 304. The control device 124 may include an absolute encoder 314, a position determiner 316, a direction controller 318, and an interlocking mechanism indicator 320.

The network interface 302 may include suitable logic, circuitry, interfaces, and/or code, executable by the circuitry, for facilitating communication using one or more communication protocols. For example, the network interface 302 may facilitate communication between the transport vehicle 108*a* and the control server 110. Examples of the network interface 302 may include, but are not limited to, an antenna, a radio frequency transceiver, a wireless transceiver, a Bluetooth transceiver, an Ethernet based transceiver, a universal serial bus (USB) transceiver, or any other device configured to transmit and receive data.

The lifting arrangement 304 may be configured to controllably move the top plate 122 under the control of the control device 124. The lifting arrangement 304 may comprise a linear actuator and a rotary actuator. The linear actuator may be configured to controllably raise or lower the top plate 122 relative to a body of the transport vehicle 108*a* to attain different orientations for the top plate 122. For example, the linear actuator may vertically move the top plate 122 from a home position (i.e., a resting or default position) to multiple raised positions. The linear actuator may further lower the top plate 122 from multiple raised positions to the home position. The rotary actuator may rotate a lifted top plate 122 in clockwise or anti-clockwise direction to attain different orientations. For example, the rotary actuator may rotate a lifted top plate 122 by a predetermined angle in the clockwise direction and may further reverse the rotation to return the top plate 122 to its original position. The lifting arrangement 304 may determine a height of lift required for a raised position and an angle of rotation of the top plate 122, based on one or more control signals received from the absolute encoder 314.

The motor driver 306 may include suitable logic, circuitry, interfaces, and/or code, executable by the circuitry, for driving the motors 308 coupled to the wheels 310. For example, the motor driver 306 may provide current to the motors 308 to drive the wheels 310. In one embodiment, the motor driver 306 may vary the current provided to the motors 308 to vary the speed of the rotation of the wheels 310.

The sensors 312 may include, but are not limited to, one or more photo sensors, one or more proximity sensors, or one or more weight sensors. For example, the photo sensors may be configured to scan the reference markers on the ISUs 106 and provide an input to the control device 124 for identifying a required ISU from the ISUs 106. The weight sensors may be configured to determine the weight exerted by the lifted ISU 106*a* on each wheel 310 of the transport vehicle 108*a*. The weight sensors may be further configured to provide an input, indicating the weight exerted by the lifted ISU 106*a* on each wheel 310, to the control device 124. For example, the control device 124 may be configured to determine the position of the COG of the ISU 106*a* based on the weight exerted by the ISU 106*a* on each wheel 310. It will be apparent to those of skill in the art that other sensors, may be used for determining various parameters mentioned above, without deviating from the scope of the disclosure.

The absolute encoder 314 may include suitable logic, circuitry, interfaces, and/or code, executable by the circuitry, for transforming an angular position or a lateral position into a control signal to be processed by the lifting arrangement 304. Thus, the absolute encoder 314 may provide different control signals for different linear and angular positions of the top plate 122. For example, if the top plate 122 is to be rotated by 30°, the control device 124 may transmit a control signal to the lifting arrangement 304, based on which the lifting arrangement 304 may rotate the top plate 122 by 30°.

The position determiner 316 and the direction controller 318 may enable the transport vehicle 108a to navigate through the storage facility 102. For example, the position determiner 316 may be configured to determine a real-time position of the transport vehicle 108a in the storage facility 102. The direction controller 318 may be configured to control the direction of movement of the transport vehicle 108a in the storage facility 102 with respect to the current location.

The interlocking mechanism indicator 320 may indicate a state of interlocking mechanism. For example, when the interlocking mechanism indicator 320 is set to a default value "0", the interlocking mechanism is not actuated, and the transport vehicle 108a may transport the ISU 106a without any engagement between the top plate 122 and the support plates 118. When the interlocking mechanism indicator 320 is set to a first value "1", the interlocking mechanism is actuated and the transport vehicle 108a may transport the ISU 106a only when the top plate 122 and the support plates 118 are successfully engaged. In one embodiment, the default value "0" may be changed to the first value "1" based on the actuation command. In another embodiment, the default value "0" may be changed to the first value "1" locally by the control device 124 to actuate the interlocking mechanism.

FIGS. 4A-4F are block diagrams that collectively illustrate an exemplary scenario 400 for transporting the ISU 106a in the storage facility 102 of FIG. 1, in accordance with an embodiment of the present disclosure.

The control server 110 may receive a service request that requires transportation of the ISU 106a from the first location to the second location in the storage facility 102. Based on the received service request, the control server 110 selects a transport vehicle from the transport vehicles 108 that is available for catering to the service request. In one example, the control server 110 may select that the transport vehicle 108a for catering to the service request.

The control server 110 further determines a first optimal path in the storage facility 102 that is to be traversed by the transport vehicle 108a for reaching at the first location, where the ISU 106a is positioned, from its current location. The control server 110 further determines a second optimal path in the storage facility 102 that is to be traversed by the transport vehicle 108a for reaching at the second location from the first location, after lifting the ISU 106a. The control server 110 then communicates a transit instruction to the transport vehicle 108a. The transit instruction may include path details of the first and second optimal paths and details of the reference marker of the ISU 106a.

Based on transit instruction, the transport vehicle 108a arrives at the first location, where the ISU 106a is placed. The transport vehicle 108a identifies the ISU 106a based on the reference marker indicated by the transit instruction and aligns beneath the base shelf 114a of the ISU 106a for lifting the ISU 106a. In FIG. 4A, the transport vehicle 108a is shown to be aligned beneath the base shelf 114a and the top plate 122 is positioned below the support plates 118. When the transport vehicle 108a is aligned beneath the base shelf 114a, the interlocking mechanism 130 of the transport vehicle 108a may be actuated based on the COG of the ISU 106a.

In one embodiment, the interlocking mechanism 130 of the transport vehicle 108a may be remotely actuated by the control server 110. In one exemplary scenario, the control server 110 may determine a velocity profile (i.e., acceleration and deceleration) of the transport vehicle 108a that is required for transporting the ISU 106a from the first location to the second location. Based on the determined velocity profile and a weight distribution profile of the ISU 106a, the control server 110 determines whether the position of the COG of the ISU 106a shifts out of the COG tolerance region of the ISU 106a during transportation. In a scenario where the control server 110 determines that the position of the COG of the ISU 106a may shift out of the COG tolerance region of the ISU 106a during transportation, the control server 110 generates and transmits the actuation command to the transport vehicle 108a. The transport vehicle 108a may receive the actuation command from the control server 110. Based on the received actuation command, a default value "0" of the interlocking mechanism 130 indicator 320 is changed to the first value "1" and the interlocking mechanism 130 is actuated.

In another embodiment, the interlocking mechanism 130 of the transport vehicle 108a may be locally actuated by the control device 124. In one exemplary scenario, the control device 124 may determine the velocity profile of the transport vehicle 108a required for transporting the ISU 106a from the first location to the second location. Based on the determined velocity profile and the weight distribution profile of the ISU 106a, the control device 124 determines that the position of the COG of the ISU 106a may shift out of the COG tolerance region of the ISU 106a during transportation. In such a scenario, the control device 124 locally actuates the interlocking mechanism 130 and changes the default value "0" of the interlocking mechanism indicator 320 to the first value "1". For the sake of ongoing description, it is assumed that the interlocking mechanism 130 of the transport vehicle 108a is actuated and the value of the interlocking mechanism 130 indicator 320 is changed to the first value "1".

Referring now to FIG. 4B, based on the actuation of the interlocking mechanism 130, the control device 124 controls the lifting arrangement 304 to lift the top plate 122 to a first height ($h_1$) from the home position. For example, the control device 124 may determine that the top plate 122 is to be lifted by 5 millimeters (mm) from the home position. The absolute encoder 314 then generates a first control signal corresponding to 5 mm, for instructing the lifting arrangement 304 to lift the top plate 122 by 5 mm. In a scenario, when the top plate 122 is lifted to the first height ($h_1$), the top plate 122 is positioned in a gap between the base shelf 114a and the support plates 118. Upon lifting the top plate 122 to the first height ($h_1$), the top plate 122 has the first orientation and is free from engagement with the plurality of the support plates 118. Based on lifting the top plate 122 to the first height ($h_1$), the lifting arrangement 304 transmits information pertaining to a current height of the top plate 122 to the control device 124. The absolute encoder 314 processes the received information to determine successful lifting of the top plate 122 to the first height ($h_1$).

Referring now to FIG. 4C, when the control device 124 determines that the top plate 122 is successfully lifted to the first height ($h_1$), the control device 124 determines the second orientation of the top plate 122 that is to be attained for engaging the top plate 122 with the two diagonally opposite support plates of the ISU 106a. For example, the control device 124 may determine that the lifted top plate 122 is to be rotated by 45° in the anti-clockwise direction for engaging the top plate 122 with the second and fourth support plates 118b and 118d of the ISU 106a. The absolute encoder 314 then generates a second control signal, corresponding to 45° in the anticlockwise direction, for instructing the lifting arrangement 304 to rotate the top plate 122 by 45° in the anti-clockwise direction (i.e., the second orientation). Based on rotation of the top plate 122 by 45° in the anticlockwise direction, the lifting arrangement 304 transmits information pertaining to a current angular position of the top plate 122, to the control device 124. The absolute encoder 314 processes the received information to determine successful rotation of the top plate 122 to attain the second orientation (i.e., by 45° in anticlockwise direction).

When the lifted top plate 122 is successfully rotated to attain the second orientation, the top plate 122 engages with the second and fourth support plates 118b and 118d. As shown in FIG. 4C, first and second edges 402a and 402b of the top plate 122 are engaged with the second and fourth support plates 118b and 118d, respectively. The control device 124 may transmit an acknowledgment to the control server 110 to indicate that the top plate 122 is engaged with the second and fourth support plates 118b and 118d of the ISU 106a.

In one embodiment, when the top plate 122 has the second orientation and is engaged with the second and fourth support plates 118b and 118d, a clearance gap ($g_1$) is formed between the first and second edges 402a and 402b and the second and fourth support plates 118b and 118d, respectively. In a non-limiting example, the first clearance gap ($g_1$) may be 28 mm. The clearance gap ($g_1$) accommodates a lateral movement of the transport vehicle 108a with respect to the ISU 106a during transportation. The elevated portions 202b and 202d may act as stoppers to prevent the lateral movement of the transport vehicle 108a with respect to the ISU 106a beyond the clearance gap ($g_1$).

In another example, the second orientation may be obtained by rotating the top plate 122 by 45° degrees in clockwise direction, thereby engaging the first and second edges 402a and 402b with the first and third support plates 118a and 118c, respectively. The rotation of the top plate 122 may be determined based on the direction of the movement of the ISU 106a during transportation.

Referring now to FIG. 4D, when the top plate 122 is engaged with the second and fourth support plates 118b and 118d, the control device 124 is configured to lift the rotated top plate 122 to a second height ($h_2$) from the home position. The absolute encoder 314 then generates a third control signal, corresponding to the second height ($h_2$), for instructing the lifting arrangement 304 to lift the rotated top plate 122 to the second height ($h_2$). Based on lifting the top plate 122 to the second height ($h_2$), the lifting arrangement 304 transmits information pertaining to a current height of the top plate 122 to the control device 124. The absolute encoder 314 processes the received information to determine successful lifting of the top plate 122 to the second height ($h_2$). When the control device 124 lifts the top plate 122 to the second height ($h_2$), the ISU 106a is lifted off the work floor of the storage facility 102 based on a contact between a bottom surface of the base shelf 114a and a top surface of the top shelf 122 as shown in FIG. 4D. In a non-limiting example, the top surface of the top plate 122 facing the base shelf 114a may be rubber coated. The rubber coating provides necessary friction to prevent slippage between the top plate 122 and the base shelf 114a. The top plate 122 may have coating of other similar materials, without deviating from the scope of the present disclosure.

In one embodiment, initially when the top plate 122 is engaged with the second and fourth support plates 118b and 118d, the top plate 122 may not be in contact with the second and fourth support plates 118b and 118d. As shown in FIG. 4D, though the top plate 122 is engaged with the fourth support plate 118d, there is no physical contact between the top plate 122 and the fourth support plate 118d. Similarly, there is no physical contact between the top plate 122 and the second support plate 118b. In another embodiment, when the top plate 122 is engaged with the second and fourth support plates 118b and 118d, the top plate 122 may be in contact with the second and fourth support plates 118b and 118d. In such a scenario, the fixed distance $d_1$ between the support plates 118 and the base shelf 114a is same as the width of the top plate 122. Thus, the top plate 122 fits in the gap between the support plates 118 and the base shelf 114a.

Figure 4E:
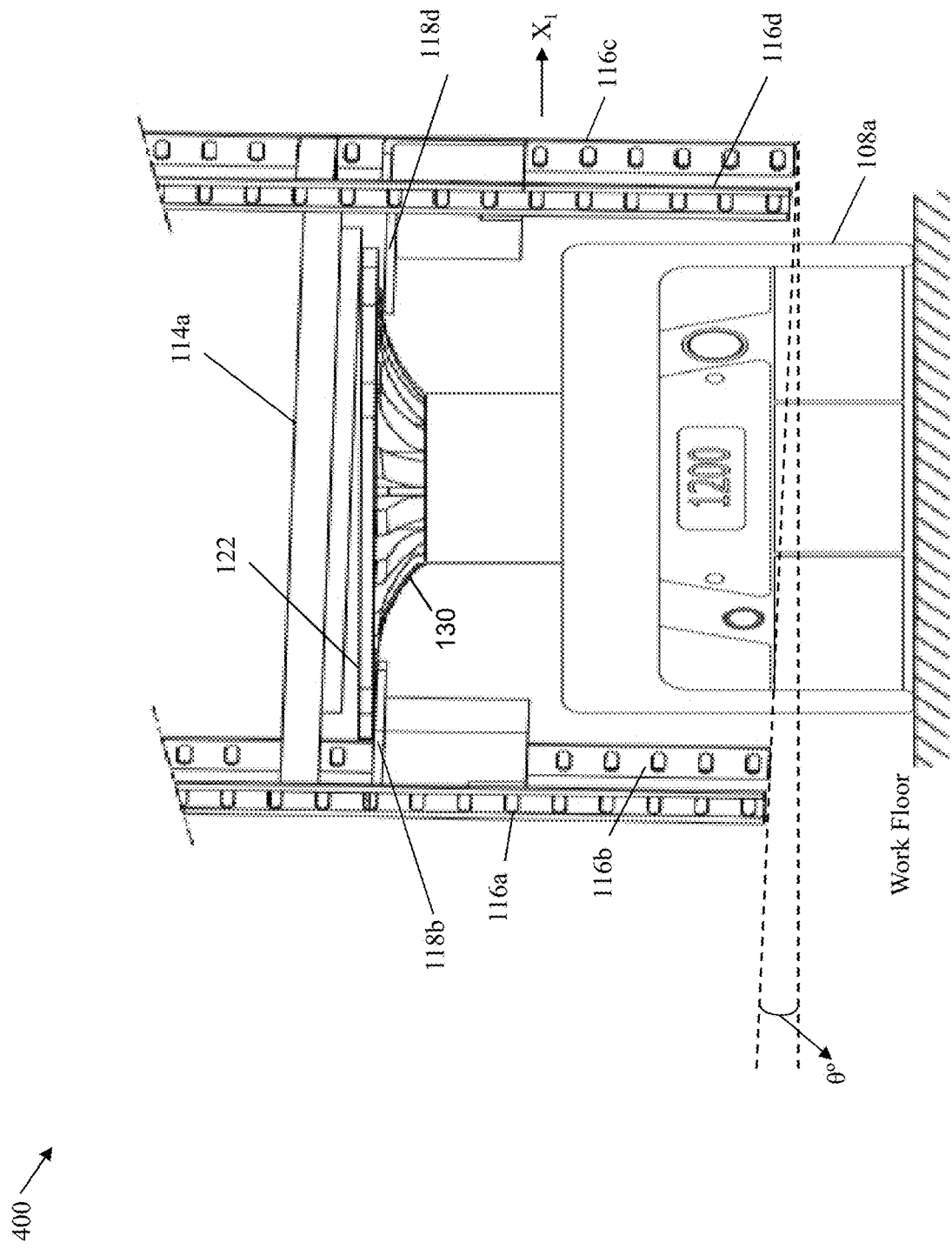

Referring now to FIG. 4E, upon lifting the ISU 106a, the control device 124 is further configured navigate the transport vehicle 108a from the first location to the second location for transporting the ISU 106a. The engagement between the top plate 122 and the second and fourth support plates 118b and 118d, and the base shelf 114a prevents the ISU 106a from toppling during transportation. In one exemplary scenario, the transport vehicle 108a, carrying the lifted ISU 106a, may be travelling in $X_1$ direction. While travelling in the $X_1$ direction, the transport vehicle 108a may decelerate before taking a turn. Due to the impact of inertial force acting on the ISU 106a, the ISU 106a may tend to displace in the direction $X_1$ and undergo an angular displacement by $\theta°$ (i.e., tilt by $\theta°$ in the direction $X_1$). In such a scenario, the second support plate 118b engaged with the first edge 402a comes in contact with the first edge 402a and acts as a stopper to prevent the ISU 106a from toppling beyond $\theta°$. In another exemplary scenario, if the ISU 106a tilts by $\theta°$ in a direction opposite to the direction $X_1$, the fourth support plate 118d engaged with the second edge 402b comes in contact with the second edge 422b and prevents the ISU 106a from toppling beyond $\theta°$.

Figure 4F:
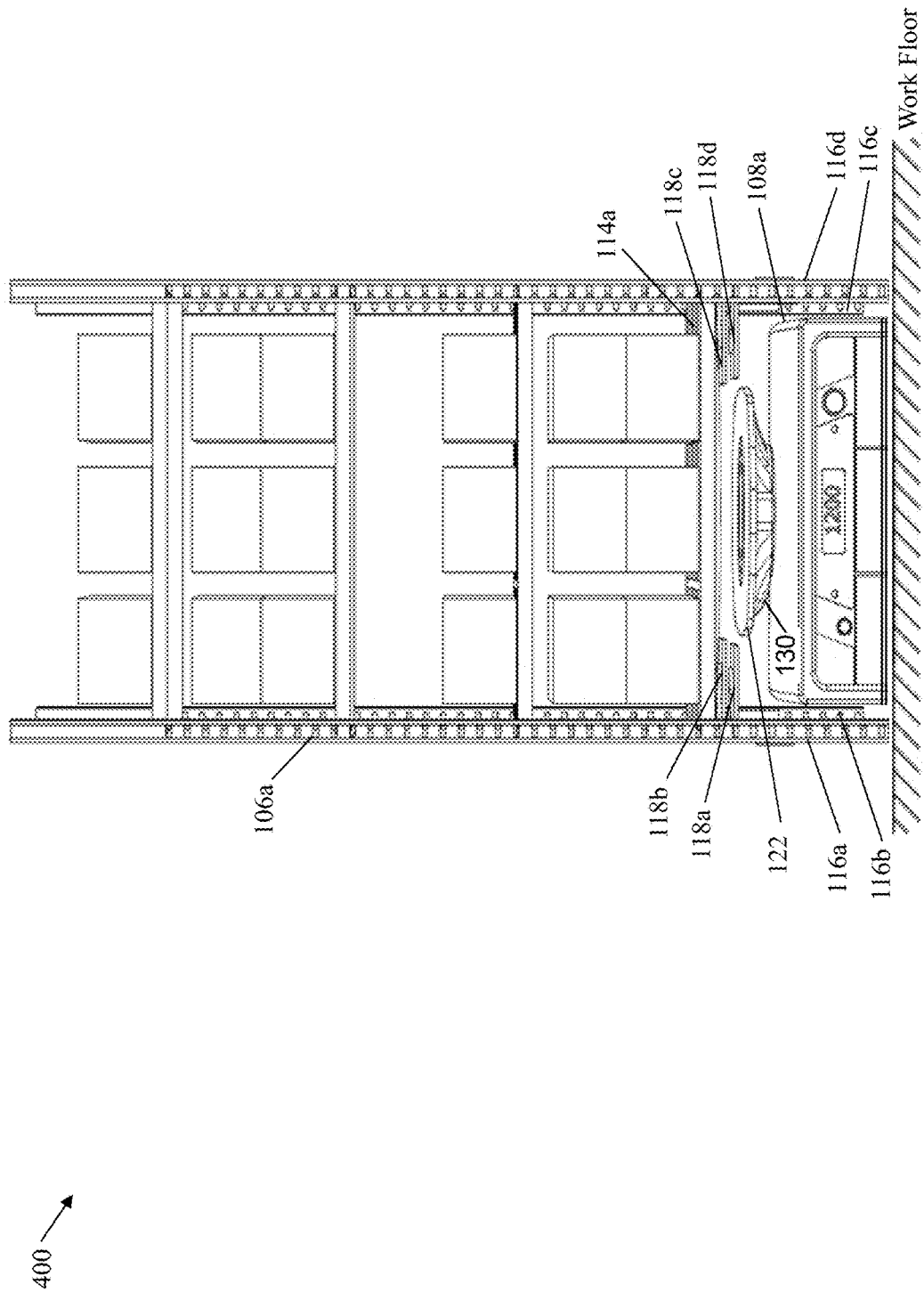

Referring now to FIG. 4F, upon reaching the second location in the storage facility 102, the control device 124 instructs the lifting arrangement 304 to place the lifted ISU 106a on the work floor by disengaging the top plate 122 from the second and fourth support plates 118b and 118d. For disengaging the top plate 122, the control device 124 instructs the lifting arrangement 304 to lower the top plate 122 to the first height ($h_1$) from the second height ($h_2$) and rotate the top plate 122 by the predetermined angle (e.g., 45°) in an opposite direction with reference to the rotation during engagement. The rotation of the top plate 122 in the opposite direction changes the second orientation to the first orientation and the top plate 122 disengages from the second and fourth support plates 118b and 118d. The top plate 122 is further lowered from the first height ($h_1$) to the home position, thereby placing the lifted ISU 106a on the work floor. The control device 124 may further set the interlocking mechanism 130 indicator 320 to the default value "0", thereby terminating the interlocking mechanism 130. Upon placing the ISU 106a on the work floor, the control device 124 may further communicate an acknowledgement to the control server 110 to indicate that the ISU 106a is successfully transported to the second location.

Figure 5:
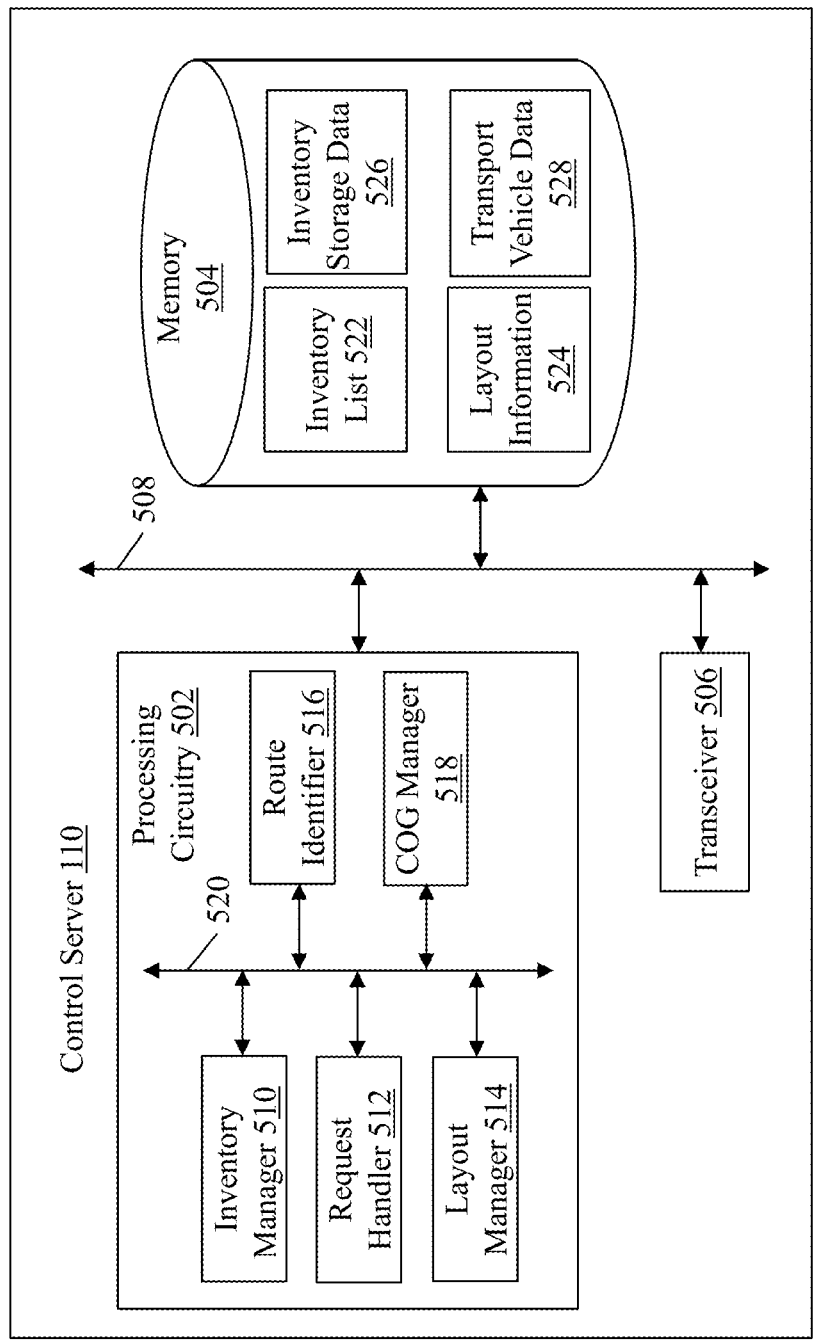
FIG. 5 is a block diagram that illustrates a control server of FIG. 1, in accordance with an exemplary embodiment of the present disclosure.

FIG. 5 is a block diagram that illustrates the control server 110, in accordance with an exemplary embodiment of the present disclosure. The control server 110 includes processing circuitry 502, a memory 504, and a transceiver 506 that communicate with each other by way of a first communication bus 508. The processing circuitry 502 includes an inventory manager 510, a request handler 512, a layout manager 514, a route identifier 516, and a COG manager 518 that communicate with each other by way of a second communication bus 520. It will be apparent to a person of ordinary skill in the art that the control server 110 is for illustrative purposes and not limited to any specific combination or hardware circuitry and/or software. For example, the control server 110 may be implemented by a server system that includes a plurality of servers each configured to perform one or a combination of the functions of the server. Furthermore, the control server 110 may be implemented by a plurality of devices that are operating over a cloud and communicating with devices in the storage facility 102 via the communication network 112.

The processing circuitry 502 includes suitable logic, circuitry, interfaces, and/or code, executed by the circuitry, for executing various operations, such as the inventory management operations, the warehouse management operations, procurement operations, COG maintenance operations, or the like. The processing circuitry 502 may be configured to determine the position of the COGs of the ISUs 106, actuate the interlocking mechanism of the transport vehicles 108 remotely, and control navigation of the transport vehicles 108, as described in foregoing description of FIGS. 1, 2, 3, and 4A-4F. The processing circuitry 502 may execute the operations by way of the inventory manager 510, the request handler 512, the layout manager 514, the route identifier 516, and the COG manager 518. Examples of the processing circuitry 502 include, but are not limited to, an application-specific integrated circuit (ASIC) processor, a reduced instruction set computing (RISC) processor, a complex instruction set computing (CISC) processor, a field-programmable gate array (FPGA), and the like.

The memory 504 includes suitable logic, circuitry, interfaces, and/or code, executed by the circuitry, to store an inventory list 522, layout information 524, inventory storage data 526, and transport vehicle data 528. Examples of the memory 504 include, but are not limited to, a random-access memory (RAM), a read-only memory (ROM), a removable storage drive, a hard disk drive (HDD), a flash memory, a solid-state memory, and the like. In one embodiment, the memory 504 may be realized through various database technologies such as, but not limited to, Microsoft® SQL, Oracle®, IBM DB2®, Microsoft Access®, PostgreSQL®, MySQL® and SQLite®. It will be apparent to a person skilled in the art that the scope of the disclosure is not limited to realizing the memory 504 in the control server 110, as described herein. In other embodiments, the memory 504 may be realized in form of an external database server or a cloud storage working in conjunction with the control server 110, without departing from the scope of the disclosure.

The inventory list 522 may include the list of inventory items and packages stored in the storage facility 102 and the number of units of each inventory item stored in the storage facility 102. The layout information 524 may include information of the layout of the storage facility 102, such as location data of the ISUs 106. The layout information 524 may further include real-time path availability information of various paths in the storage facility 102. For example, a first path in the storage facility 102 may be under maintenance and hence is unavailable for traversing.

The inventory storage data 526 is indicative of storage locations of the inventory items stored in the ISUs 106. The inventory storage data 526 further includes the reference markers of the ISUs 106. The reference identifiers are unique codes assigned to each of the ISUs 106. In one example, the reference markers are radio frequency identification (RFID) tags that are readable by the transport vehicles 108. Thus, based on the inventory storage data 526, the control server 110 is aware of the locations of all inventory items stored in the storage facility 102. The inventory storage data 526 further includes details of the current positions of the COGs of the ISUs 106.

The transport vehicle data 528 is indicative of details of the transport vehicles 108 available in the storage facility 102. The details of the transport vehicles 108 may include weight lifting capacity, size, and dimension of each transport vehicle 108.

The transceiver 506 transmits and receives data over the communication network 112 using one or more communication network protocols. The transceiver 506 transmits various requests and messages to the transport vehicles 108 and receives requests and messages from the transport vehicles 108. Examples of the transceiver 506 include, but are not limited to, an antenna, a radio frequency transceiver, a wireless transceiver, a Bluetooth transceiver, an ethernet based transceiver, a USB transceiver, or any other device configured to transmit and receive data.

The inventory manager 510 manages the inventory list 522 stored in the memory 504. For example, the inventory manager 510 adds new inventory items to the inventory list 522 when the new inventory items are stored in the storage facility 102 and updates the inventory list 522 based on various service requests.

The request handler 512 processes all the service requests received from external communication system and stores a record (i.e., the historical request data) of all historical service requests in the memory 504. In one embodiment, the request handler 512 merges one or more service requests to optimize operations in the storage facility 102. The layout manager 514 manages the layout information 524. For example, if there is any change in the layout of the storage facility 102 (such as a change in the arrangement of the ISUs 106), the layout manager 514 updates the layout information 524 based on the change in the layout. The route identifier 516 is responsible for identifying the optimal paths, e.g., the first and second optimal paths. The COG manager 518 determines the variation in the position of COG of all the ISUs 106. In one embodiment, based on the determination that the COG of the ISU 106a may shift out of the COG tolerance region of the ISU 106a, the COG manager 518 may actuate the interlocking mechanism (as described in foregoing description in FIG. 1).

Though, the processing circuitry 502 is depicted as a hardware component in FIG. 5, a person skilled in the art will appreciate that the scope of the disclosure is not limited to realizing the processing circuitry 502 as the hardware component. In another embodiment, the functionality of the processing circuitry 502 may be implemented by way of a computer executable code or a set of computer readable instructions stored in the memory 504, without deviating from the spirit of the disclosure.

Figure 6:
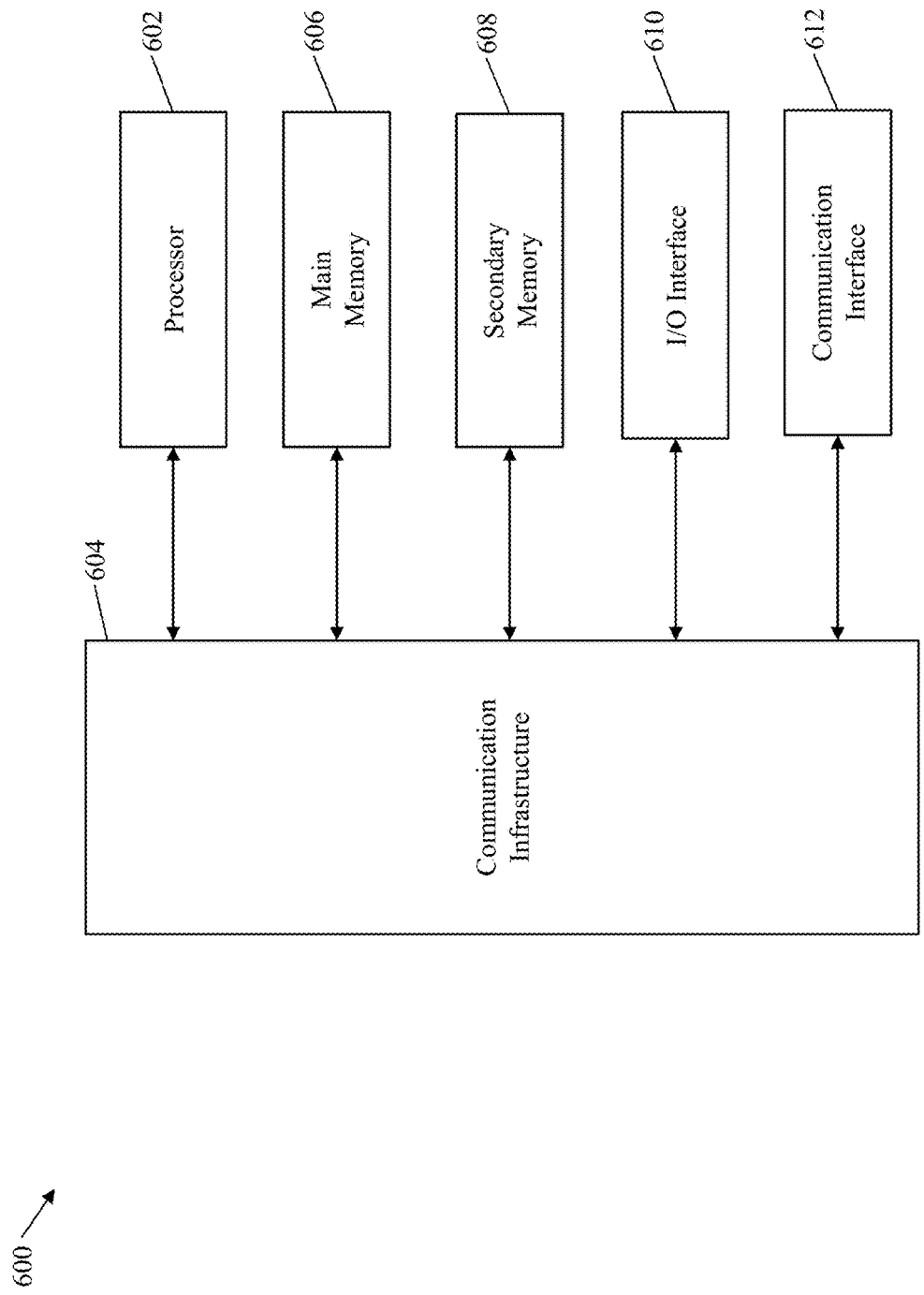
FIG. 6 is a block diagram that illustrates an architecture of a computer system, in accordance with an exemplary embodiment of the present disclosure.

FIG. 6 is a block diagram that illustrates system architecture of a computer system 600, in accordance with an exemplary embodiment of the disclosure. An embodiment of the disclosure, or portions thereof, may be implemented as computer readable code on the computer system 600. In one example, the control server 110 may be implemented in the computer system 600. Hardware, software, or any combination thereof may embody modules and components used to implement methods of FIGS. 7A, and B. The computer system 600 includes a processor 602 that may be connected to a communication infrastructure 604. The computer system 600 may further include a main memory 606 and a secondary memory 608. The computer system 600 further includes an input/output (I/O) interface 610 and a communication interface 612. The communication interface 612 may allow data transfer between the computer system 600 and various devices that are communicatively coupled to the computer system 600.

Figure 7A:
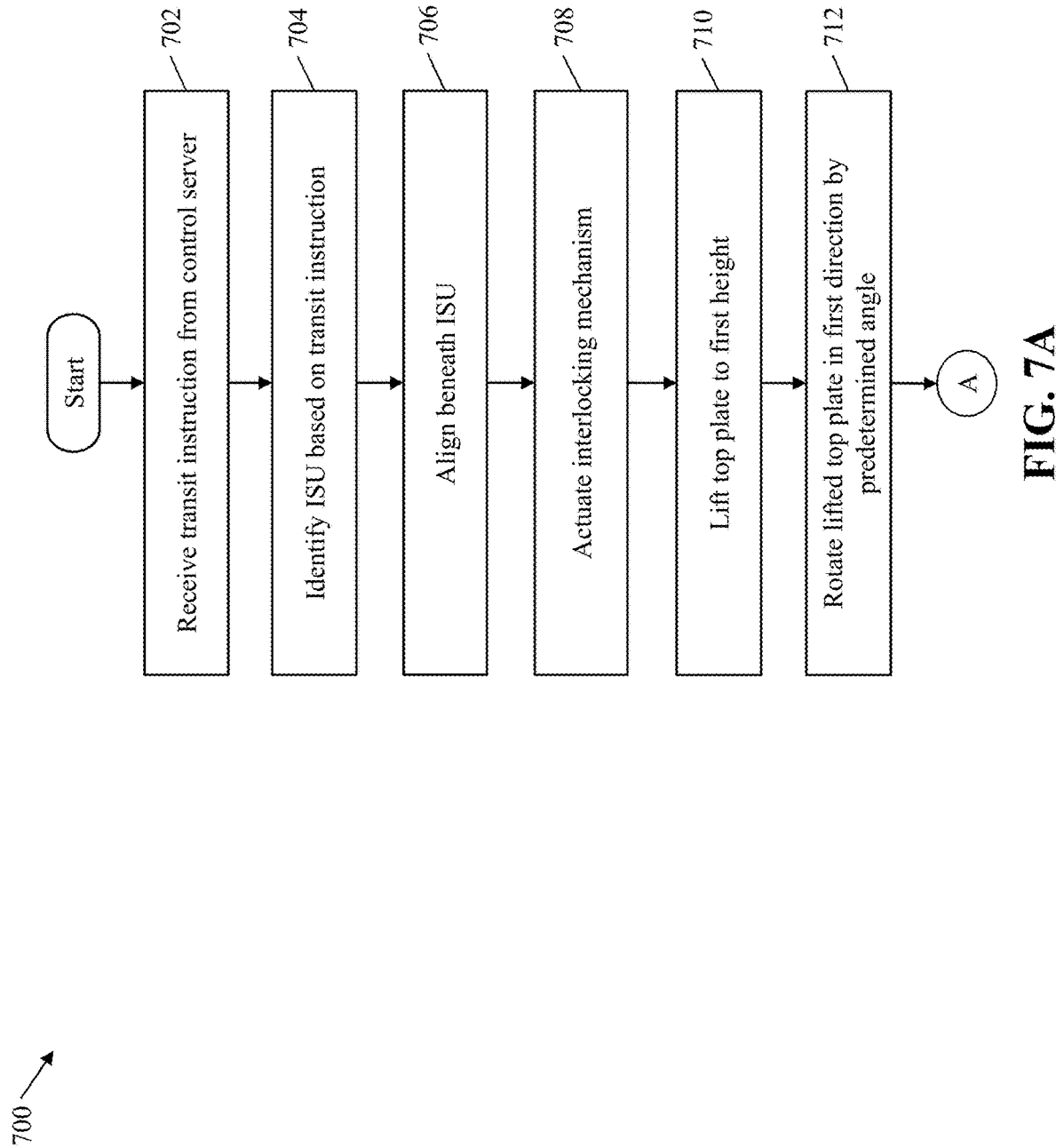
FIGS. 7A and 7B, collectively represent a flow chart that illustrates a process for transporting inventory in the storage facility of FIG. 1, in accordance with an exemplary embodiment of the present disclosure.
Figure 7B:
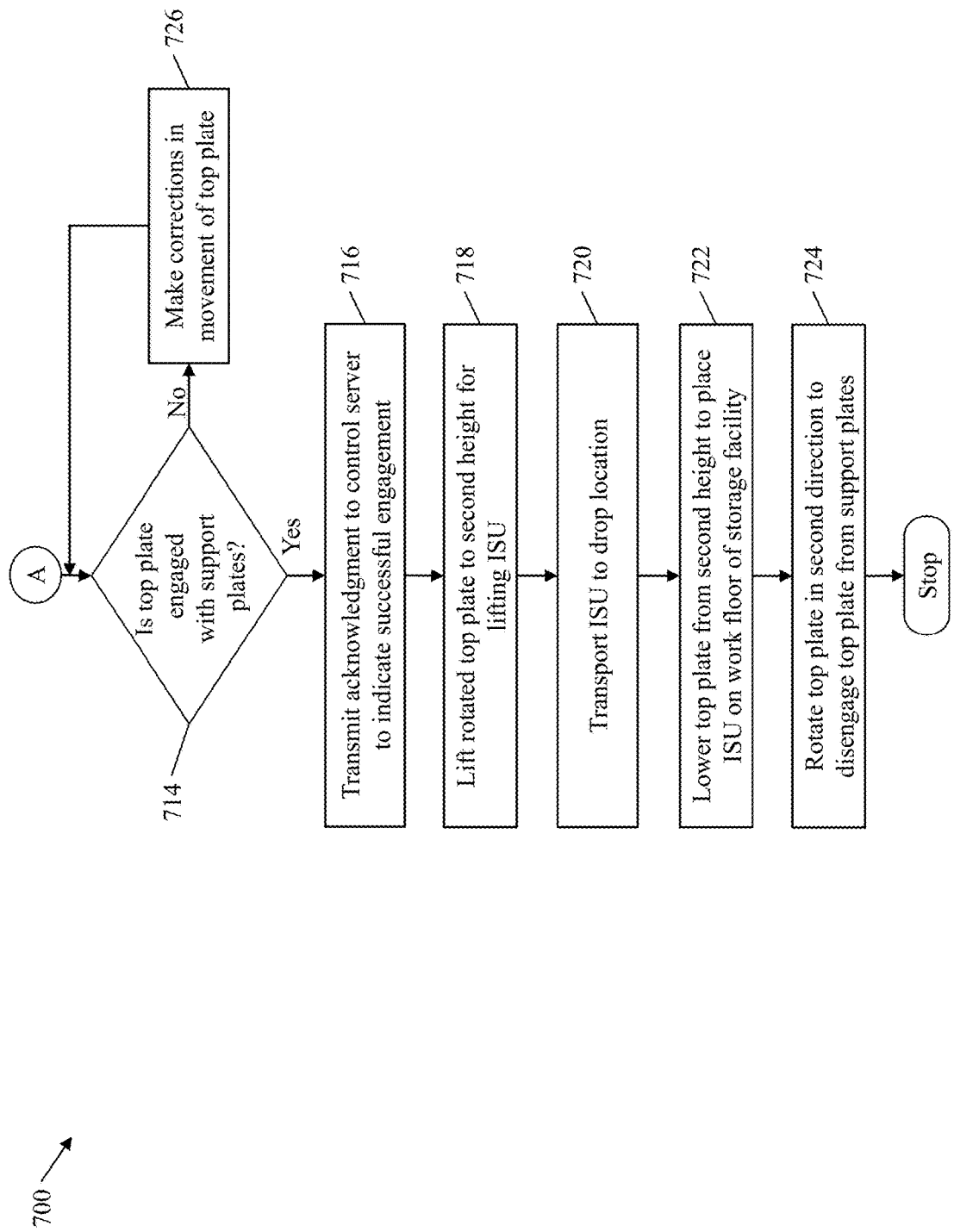

FIGS. 7A and 7B, collectively represent a flow chart 700 that illustrates a process (i.e., a method) for transporting inventory in the storage facility 102, in accordance with an exemplary embodiment of the disclosure.

The process may generally start at step 702, where the transport vehicle 108a receives a transit instruction from the control server 110 to transport the ISU 106a from a first location to a second location in the storage facility 102. The transit instruction may include details pertaining to the pickup location (i.e., the first location), the drop location (i.e., the second location), the reference marker details of the ISU 106a that needs to be transported, and path details of a path that is to be traversed by the transport vehicle 108a for transporting the ISU 106a. The process proceeds to step 704, where the transport vehicle 108a identifies the ISU 106a from the ISUs 106 based on the transit instruction. The transport vehicle 108a may arrive at the first location and scan the reference marker to identify the ISU 106a. The process proceeds to step 706, based on successful identification of the ISU 106a, the transport vehicle 108a aligns beneath the ISU 106a.

The process proceeds to step 708, where the transport vehicle 108a actuates the interlocking mechanism. The interlocking mechanism is actuated based on the position of the COG of the ISU 106a. In another embodiment, the control server 110 may remotely actuate the interlocking mechanism of the transport vehicle 108a based on the position of the COG of the ISU 106a. The process proceeds to step 710, where the top plate 122 of the transport vehicle 108a is lifted to the first height ($h_1$). Upon lifting the top plate 122 to the first height, the top plate 122 has the first orientation and is free from engagement with the support plates 118. The process proceeds to step 712, where the lifted top plate 122 is rotated in a first direction by a predetermined angle. The rotation of the lifted top plate 122 changes the first orientation to the second orientation and engages the top plate 122 with two diagonally opposite support plates of the ISU 106a. The process then proceeds to process A illustrated in FIG. 7B.

With reference to FIG. 7B, the process A proceeds to step 714, where the transport vehicle 108a determines whether the top plate 122 is engaged with the support plates 118 of the ISU 106a. If at step 714, it is determined that the top plate 122 is engaged with the support plates 118, the process proceeds to step 716. At step 716, the transport vehicle 108a transmits the acknowledgment to the control server 110 to indicate that the top plate 122 is engaged with the support plates 118.

The process proceeds to step 718, where upon engagement of the top plate 122 with the support plates 118, the rotated top plate 122 is further lifted to the second height ($h_2$) to lift the ISU 106a off the work floor of the storage facility 102. The process proceeds to step 720, where the transport vehicle 108a, transports the lifted ISU 106a to the drop location (i.e., the second location) based on the transit instruction and communicates the acknowledgement to the control server 110 to indicate that the ISU 106a is transported to the drop location. The process proceeds to step 722, where the top plate 122 is lowered from the second height ($h_2$) to the first height ($h_1$) to place the ISU 106a on the work floor of the storage facility 102. The process proceeds to step 724, where the top plate 122 is rotated in a second direction opposite to the first direction by the predetermined angle to disengage the top plate 122 from the support plates 118, and then the process proceeds to stop.

If at step 714, it is determined that the top plate 122 is not engaged with the support plates 118 of the ISU 106a, the process proceeds to step 726. At step 726, the transport vehicle 108a performs correction in the movement of the top plate 122 to engage with the support plates 118 of the ISU 106a and the process proceeds to step 714.

The system and method of the disclosure enable to secure the ISUs 106 to the transport vehicles 108 during transportation. Engagement between the top plate 122 and the support plates 118 prevents the ISU 106a from toppling during transportation. Thus, the damage caused to inventory and operators in the storage facility 102, and down time of the storage facility 102 due to toppling of the ISUs 106 is reduced. Since the ISUs 106 are prevented from toppling, there is no requirement to reserve space around an assembly of an ISU and a transport vehicle, thereby, improving grid-space utilization in the storage facility 102. As the ISUs 106 are engaged with the transport vehicles 108 during transportation, the control server 110 has the flexibility to have larger COG tolerance regions for the ISUs 106, which in turn improves space utilization of the ISUs 106. Due to technological improvements in the ISUs 106, the transport vehicles 108, and the control server 110, the ISUs 106 are prevented from toppling without any manual intervention or requirement of expensive hardware and circuitry, such as electromagnetic sensors and locks. Further, existing ISUs may require minor structural modifications, such as attachment of the support plates 118, for implementing the disclosed method, thereby making the system and method of the disclosure backward compatible.

A person of ordinary skill in the art will appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. Further, the operations may be described as a sequential process, however some of the operations may in fact be performed in parallel, concurrently, and/or in a distributed environment, and with program code stored locally or remotely for access by single or multiprocessor machines. In addition, in some embodiments the order of operations may be rearranged without departing from the spirit of the disclosed subject matter.

Techniques consistent with the present disclosure provide, among other features a method and system for transporting inventory items in a storage facility. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the width or scope.

While various embodiments of the present disclosure have been illustrated and described, it will be clear that the present disclosure is not limited to these embodiments only. Numerous modifications, changes, variations, substitutions, and equivalents will be apparent to those skilled in the art, without departing from the spirit and scope of the present disclosure, as described in the claims.

What is claimed is:

1. A system for transporting inventory in a facility, the system comprising:
   an inventory storage unit that stores one or more inventory items, the inventory storage unit comprising:
      a base shelf; and
      a plurality of support plates mounted below the base shelf;
   a transport vehicle for transporting the inventory storage unit, the transport vehicle comprising:
      a top plate having first and second orientations; and
      a control device configured to control movement of the top plate, wherein the control device is configured to:
         actuate an interlocking mechanism of the transport vehicle, aligned beneath the inventory storage unit, based on a center of gravity of the inventory storage unit;
         lift the top plate to a first height for positioning the top plate between the base shelf and the plurality of support plates, upon the actuation of the interlocking mechanism, wherein the top plate has the first orientation when lifted to the first height, and is free from engagement with the plurality of support plates;
         rotate the top plate that is at the first height by a predetermined angle in a first direction, wherein rotating the top plate changes the first orientation to the second orientation and the top plate engages with at least one support plate of the plurality of support plates; and
         lift the rotated top plate to a second height to lift the inventory storage unit off a work floor of the facility, for transportation, wherein the inventory storage unit is lifted off the work floor based on a contact between a top surface of the top plate and a bottom surface of the base shelf, and wherein the at least one support plate prevents the lifted inventory storage unit from toppling during transportation.

2. The system of claim 1, wherein each of the plurality of support plates includes an elevated portion on a surface thereof such that when the top plate is engaged with the at least one support plate, a clearance gap is formed between an edge of the top plate and the elevated portion of the at least one support plate.

3. The system of claim 1, wherein the transport vehicle is configured to transport the inventory storage unit from a first location to a second location in the facility, based on the lifting of the inventory storage unit off the work floor.

4. The system of claim 3, wherein when the lifted inventory storage unit tilts during transportation, a contact is established between the top plate and the at least one support plate, preventing the lifted inventory storage unit from toppling.

5. The system of claim 3, wherein upon reaching the second location, the control device is further configured to:
   lower the rotated top plate from the second height to the first height to place the inventory storage unit on the work floor, and
   rotate the lowered top plate by the predetermined angle in a second direction opposite to the first direction, wherein rotating the lowered top plate in the second direction changes the second orientation to the first orientation and the top plate disengages from the at least one support plate.

6. The system of claim 1, wherein the transport vehicle further comprises a sensor that is configured to detect a reference marker associated with the inventory storage unit for aligning the transport vehicle beneath the inventory storage unit.

7. A method for transporting inventory in a facility, comprising:
   actuating, by a control device of a transport vehicle, an interlocking mechanism of the transport vehicle that is aligned beneath an inventory storage unit, wherein the interlocking mechanism is actuated based on a center of gravity of the inventory storage unit;
   lifting, by the control device, a top plate of the transport vehicle to a first height for positioning the top plate between a base shelf of the inventory storage unit and a plurality of support plates of the inventory storage unit, upon the actuation of the interlocking mechanism, wherein the top plate has a first orientation when lifted to the first height, and is free from engagement with the plurality of support plates;
   rotating, by the control device, the top plate that is at the first height by a predetermined angle in a first direction, wherein rotating the top plate changes the first orientation to a second orientation and the top plate engages with at least one support plate of the plurality of support plates; and
   lifting, by the control device, the rotated top plate to a second height to lift the inventory storage unit off a work floor of the facility, for transportation, wherein the inventory storage unit is lifted off the work floor based on a contact between a top surface of the top plate and a bottom surface of the base shelf, and wherein the at least one support plate prevents the lifted inventory storage unit from toppling during transportation.

8. The method of claim 7, wherein each of the plurality of support plates includes an elevated portion on a surface thereof such that when the top plate is engaged with the at least one support plate, a clearance gap is formed between an edge of the top plate and the elevated portion of the at least one support plate.

9. The method of claim 7, further comprising transporting, by the transport vehicle, the inventory storage unit from a first location to a second location in the facility, based on the lifting of the inventory storage unit off the work floor.

10. The method of claim 9, wherein when the lifted inventory storage unit tilts during transportation, a contact is established between the top plate and the at least one support plate, preventing the lifted inventory storage unit from toppling.

11. The method of claim 9, further comprising:
   lowering, by the control device, upon reaching the second location, the rotated top plate from the second height to the first height to place the inventory storage unit on the work floor; and
   rotating, by the control device, the lowered top plate by the predetermined angle in a second direction opposite to the first direction, wherein rotating the lowered top plate in the second direction changes the second orientation to the first orientation and the top plate disengages from the at least one support plate.

12. The method of claim 7, further comprising detecting, by a sensor of the transport vehicle, a reference marker associated with the inventory storage unit for aligning the transport vehicle beneath the inventory storage unit.

13. A system for transporting inventory in a facility, the system comprising:
- an inventory storage unit comprising:
  - a base shelf; and
  - a plurality of support plates mounted below the base shelf;
- a transport vehicle for transporting the inventory storage unit, the transport vehicle comprising:
  - a top plate having first and second orientations; and
  - a control device configured to control movement of the top plate; and
- a server that is communicatively coupled to the transport vehicle and configured to:
  - actuate an interlocking mechanism of the transport vehicle, aligned beneath the inventory storage unit, based on a center of gravity of the inventory storage unit, wherein based on the actuation of the interlocking mechanism, the control device is further configured to:
    - lift the top plate to a first height for positioning the top plate between the base shelf and the plurality of support plates, upon the actuation of the interlocking mechanism, wherein the top plate has the first orientation when lifted to the first height, and is free from engagement with the plurality of support plates;
    - rotate the top plate that is at the first height by a predetermined angle in a first direction, wherein rotating the top plate changes the first orientation to the second orientation and the top plate engages with at least one support plate of the plurality of support plates; and
    - lift the rotated top plate to a second height to lift the inventory storage unit off a work floor of the facility, for transportation, wherein the inventory storage unit is lifted off the work floor based on a contact between a top surface of the top plate and a bottom surface of the base shelf, and wherein the at least one support plate prevents the lifted inventory storage unit from toppling during transportation.

14. The system of claim 13, wherein each of the plurality of support plates includes an elevated portion on a surface thereof such that when the top plate is engaged with the at least one support plate, a clearance gap is formed between an edge of the top plate and the elevated portion of the at least one support plate.

15. The system of claim 13, wherein the server is further configured to receive an acknowledgment from the control device that indicates the engagement of the top plate with the at least one support plate.

16. The system of claim 13, wherein the transport vehicle is configured to transport the inventory storage unit from a first location to a second location in the facility, based on the lifting of the inventory storage unit off the work floor.

17. The system of claim 16, wherein when the lifted inventory storage unit tilts during transportation, a contact is established between the top plate and the at least one support plate, preventing the lifted inventory storage unit from toppling.

18. The system of claim 16, wherein upon reaching the second location, the control device is further configured to:
- lower the rotated top plate from the second height to the first height to place the inventory storage unit on the work floor, and
- rotate the lowered top plate by the predetermined angle in a second direction opposite to the first direction, wherein rotating the lowered top plate in the second direction changes the second orientation to the first orientation and the top plate disengages from the at least one support plate.

19. The system of claim 16, wherein upon placing the inventory storage unit on the work floor, the control device is further configured to communicate an acknowledgement to the server to indicate that the inventory storage unit is transported to the second location.

20. The system of claim 13, wherein the transport vehicle further comprises a sensor that is configured to detect a reference marker associated with the inventory storage unit for aligning the transport vehicle beneath the inventory storage unit.

* * * * *